United States Patent [19]
Minakawa et al.

[11] Patent Number: 5,636,076
[45] Date of Patent: Jun. 3, 1997

[54] AUTOMATIC RECORDING CURRENT CONTROLLER OF MAGNETIC RECORDER

[75] Inventors: Tokuichi Minakawa; Shinji Tanimoto, both of Tokyo, Japan

[73] Assignee: Akai Electric Co., Ltd., Tokyo, Japan

[21] Appl. No.: 448,967

[22] Filed: May 24, 1995

[30] Foreign Application Priority Data

| | | | |
|---|---|---|---|
| May 25, 1994 | [JP] | Japan | 6-135010 |
| Jun. 20, 1994 | [JP] | Japan | 6-160551 |
| Dec. 16, 1994 | [JP] | Japan | 6-313809 |

[51] Int. Cl.$^6$ .............................. G11B 5/02; H04N 5/91
[52] U.S. Cl. .............................. 360/67; 386/96
[58] Field of Search .............. 360/64–67, 19.1; 386/96

[56] References Cited

U.S. PATENT DOCUMENTS 5,196,967  3/1993  Mederer et al. .................. 360/66

FOREIGN PATENT DOCUMENTS

0316758A3  10/1991  European Pat. Off. .
5081769    4/1993   Japan .
5197907    8/1993   Japan .

*Primary Examiner*—Aristotelis Psitos
*Assistant Examiner*—Regina Y. Neal
*Attorney, Agent, or Firm*—Whitham, Curtis, Whitham & McGinn

[57] ABSTRACT

After an audio signal at a given level is recorded, the recording level is changed and a video signal is recorded. The audio and video signals are reproduced. A first recording level at which the reproduced video signal becomes the maximum level, a second recording level which is smaller than the first recording level and at which the reproduced video signal level becomes the maximum value×0.9, a third recording level at which the reproduced audio signal level is equal to or greater than a reference value, and a fourth recording level at which the reproduced audio signal level becomes equal to or greater than the minimum value are stored in storages, respectively. The video head recording current value is controlled according to the optimum recording level found by an arithmetic section based on the stored recording levels.

22 Claims, 19 Drawing Sheets

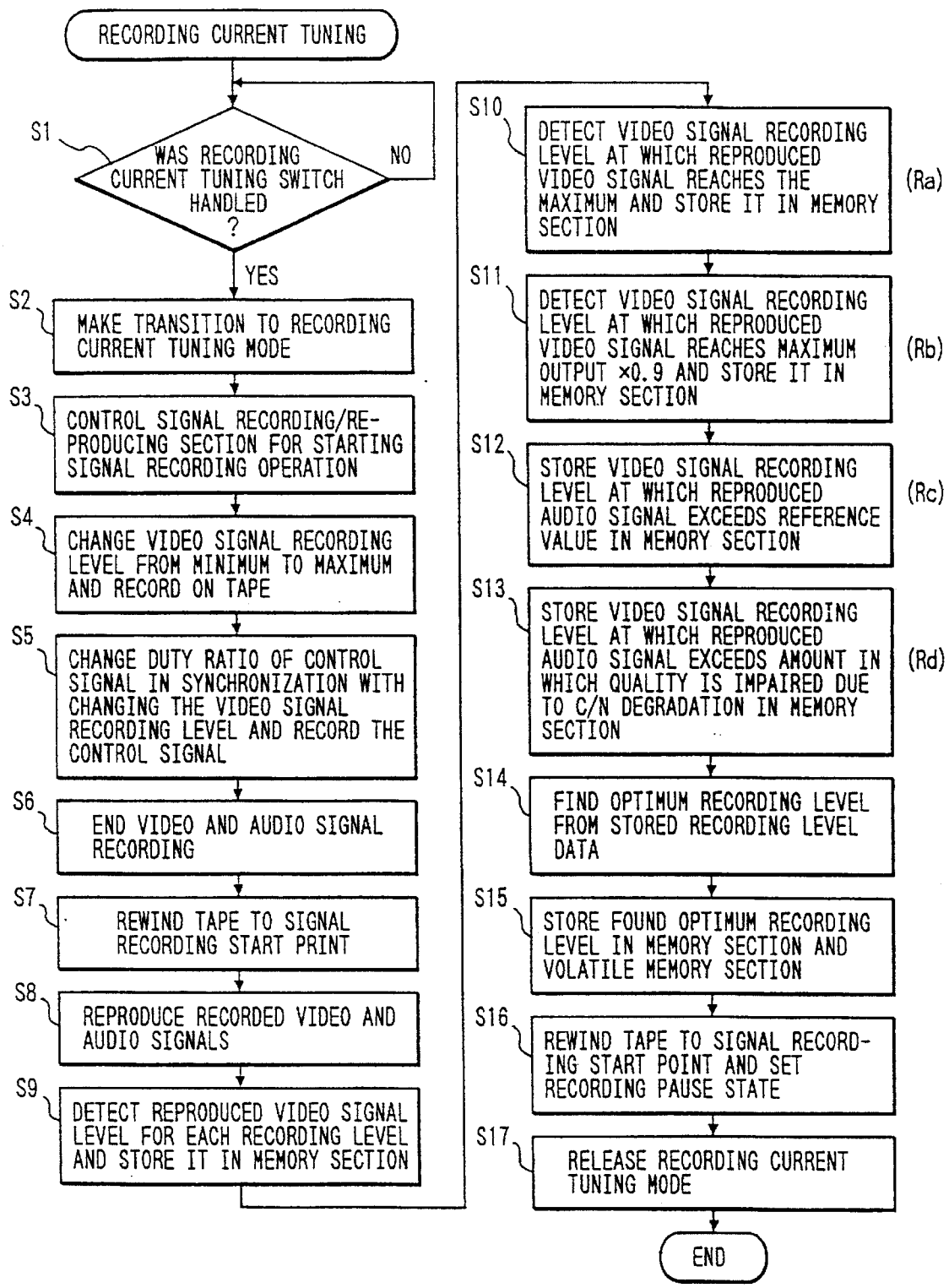

FIG. 5(A) AUDIO SIGNAL RECORDING CURRENT

FIG. 5(B) VIDEO SIGNAL RECORDING CURRENT

FIG. 5(C) DUTY RATIO OF CONTROL SIGNAL

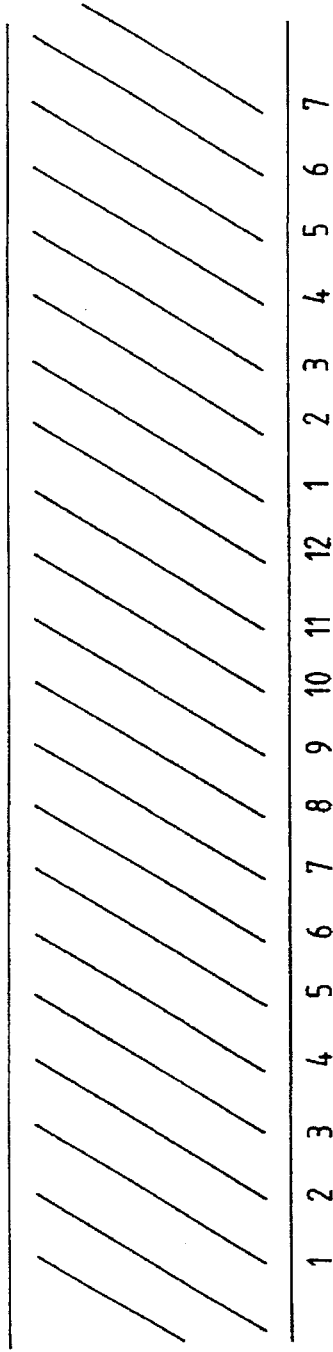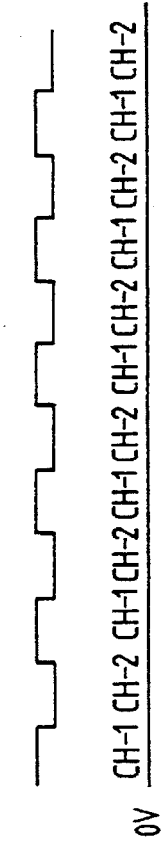
FIG. 6(A) DUTY RATIO OF CONTROL SIGNAL VIDEO RECORDING ADDRESS
FIG. 6(B) RECORD SIGNAL ON TAPE
FIG. 6(C) VIDEO DETECTOR OUTPUT
FIG. 6(D) AUDIO DETECTOR OUTPUT FIG. 7(A) AUDIO SIGNAL RECORDING CURRENT
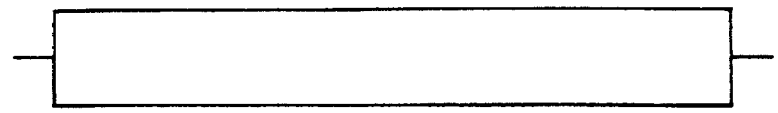
FIG. 7(B) VIDEO SIGNAL RECORDING CURRENT
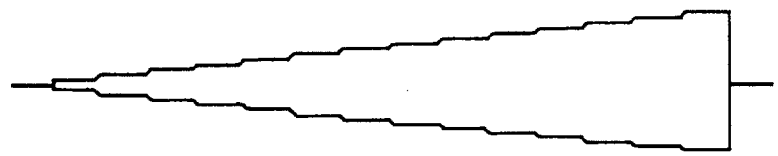
FIG. 7(C) REPRODUCED AUDIO SIGNAL EXAMPLE
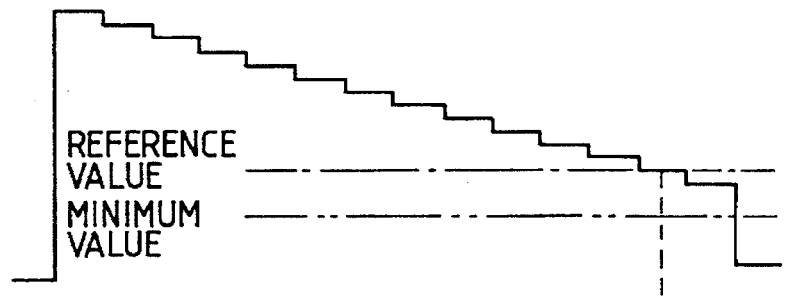
FIG. 7(D) REPRODUCED VIDEO SIGNAL EXAMPLE
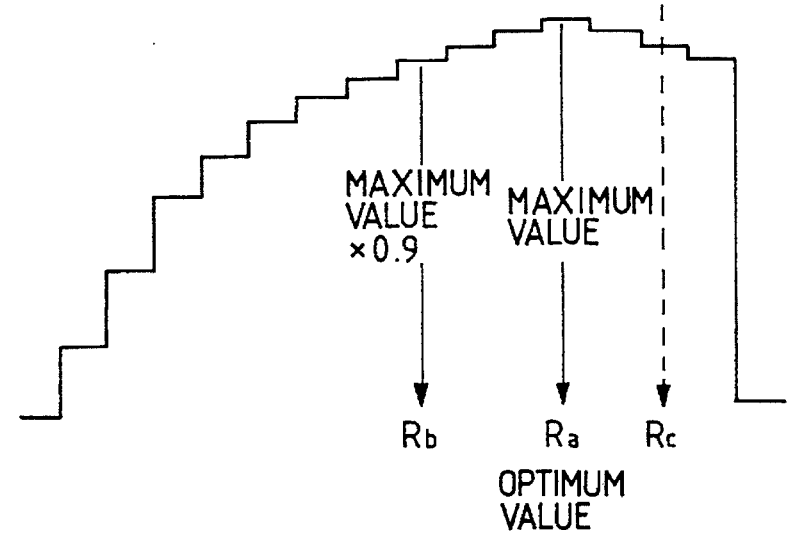

AUDIO SIGNAL
RECORDING
CURRENT

VIDEO SIGNAL
RECORDING
CURRENT

REPRODUCED
AUDIO SIGNAL
EXAMPLE

REPRODUCED
VIDEO SIGNAL
EXAMPLE

AUDIO SIGNAL
RECORDING
CURRENT

VIDEO SIGNAL
RECORDING
CURRENT

REPRODUCED
AUDIO SIGNAL
EXAMPLE

REPRODUCED
VIDEO SIGNAL
EXAMPLE

AUDIO SIGNAL RECORDING CURRENT

VIDEO SIGNAL RECORDING CURRENT

REPRODUCED AUDIO SIGNAL EXAMPLE

REPRODUCED VIDEO SIGNAL EXAMPLE

AUDIO SIGNAL RECORDING CURRENT

VIDEO SIGNAL RECORDING CURRENT

REPRODUCED AUDIO SIGNAL EXAMPLE

REPRODUCED VIDEO SIGNAL EXAMPLE

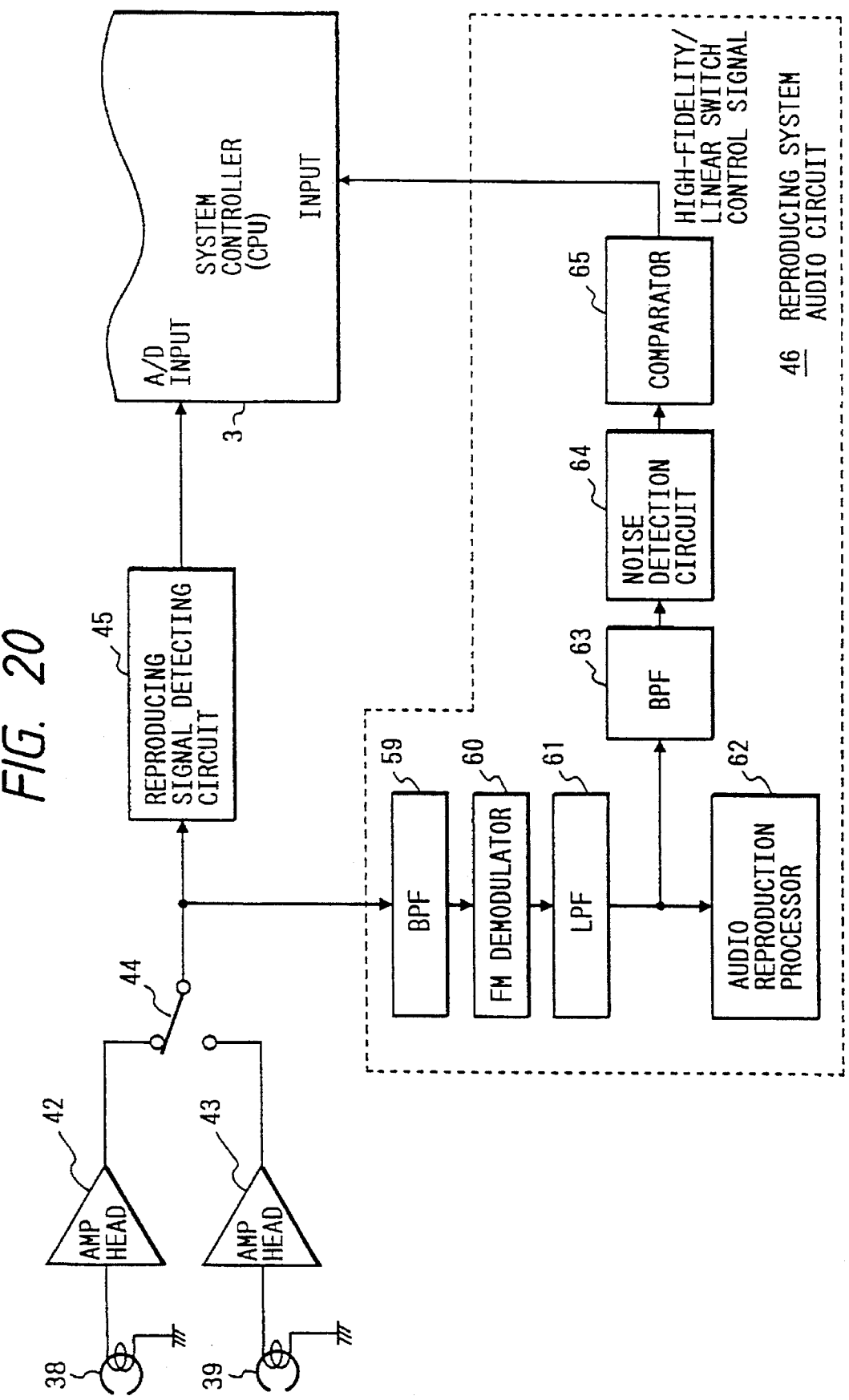

AUDIO SIGNAL RECORDING CURRENT

VIDEO SIGNAL RECORDING CURRENT

REPRODUCED AUDIO SIGNAL EXAMPLE

REFERENCE VALUE (MINIMUM VALUE ×2)
MINIMUM VALUE

HIGH FIDELITY/ LINEAR AUDIO CONTROL

HiFi    LINEAR

REPRODUCED VIDEO SIGNAL EXAMPLE

MAXIMUM VALUE ×0.9    MAXIMUM VALUE

Rb   Ra   Rc   Rd
OPTIMUM VALUE

AUTOMATIC RECORDING CURRENT CONTROLLER OF MAGNETIC RECORDER

BACKGROUND OF THE INVENTION

The present invention relates to an automatic recording current controller when two different signals are double recorded in the deep portion and surface portion of a magnetic recording medium in a magnetic recorder (containing also a magnetic recorder/reproducer) such as a video tape recorder (VTR), MTR, or a data recorder (magnetic recording media are not limited to tape media).

For example, a video tape recorder (VTR) for recording a high-fidelity audio signal in the deep portion of a magnetic tape of a magnetic recording medium and for recording a video signal overlapping the audio signal in the surface portion thereof, is known as a magnetic recorder capable of double recording.

Generally, in such a conventional VTR, when video and audio signals are recorded, the setup optimum recording level is referenced for controlling the recording current of the video signal.

An auto calibration device (automatic recording current controller) for automatically adjusting the recording level of a video signal recorded in the surface portion of a magnetic tape to an optimum value in double magnetic recording in such a VTR is described, for example, in Japanese Patent Unexamined Publication No. Hei 5-197907.

This device relates to a VTR which records an audio signal at a given level in the deep portion of a magnetic tape, then records a video signal, whose level changes step-wise, in the surface portion so as to overlap the audio signal. The recording level Wa of the video signal when the level of the video signal reproduced from the magnetic tape reaches the maximum, is stored in a storage. Also, the recording level Wb of the video signal when the level of the reproduced audio signal exceeds a preset reference value, is stored in the storage. When Wa≦Wb, Wa is adopted as the optimum recording level; when Wa>Wb, if Wb lies within a predetermined range with respect to Wa, Wb is adopted as the optimum recording level; when Wb is outside the predetermined range, the level nearest to Wb in the predetermined range is adopted as the optimum recording level.

By the way, even if such a conventional automatic recording current controller attempts to determine the predetermined range with respect to the recording level Wa and place the reproduced video signal level in an allowable range, it is impossible to precisely control the video signal recording level. This can be explained in the following example:

The reproduced video signal level with respect to the recorded video signal level varies depending on the type of a magnetic tape used or degradation of the recording/reproducing characteristic of the tape.

Since the predetermined range is determined for the video signal recording level Wa when the reproduced video signal level reaches the maximum, even if the video signal recording level is the same value in the predetermined range, the reproduced video signal level may vary, whereby the picture quality of an image provided by the reproduced video signal may be impaired.

SUMMARY OF THE INVENTION

The present invention has been made in view of the above-described drawbacks in the prior art. It is therefore an object of the invention to provide an automatic recording current controller which can always set an optimum recording level of a signal recorded in a deep portion of a magnetic recording medium and automatically control recording current thereof regardless of the type, recording and reproducing characteristics, etc., of the magnetic recording media to be used in a magnetic recorder capable of double magnetic recording as described above.

To achieve the object, according to the present invention, in an automatic recording current controller of a magnetic recorder which has first and second recording heads and is capable of double magnetic recording such that a first signal is recorded in a deep portion of a magnetic recording medium through the first recording head and then a second signal is recorded in a surface portion of the magnetic recording medium through the second magnetic head, the following structures are adopted.

(1) According to a first aspect of the invention, the above automatic recording current controller comprises:

recording level changing means for changing a recording level when the second signal is recorded through the second recording head;

first signal amount detection means for detecting an amount of the first signal recorded in the deep portion of the magnetic recording medium;

second signal amount detection means for detecting an amount of the second signal recorded in the surface portion of the magnetic recording medium;

first recording level detection means for detecting a first recording level of the second signal when the first signal amount detected by the first signal amount detection means becomes equal to or greater than a preset reference value;

second recording level detection means for detecting a second recording level of the second signal when the second signal amount detected by the second signal amount detection means reaches the maximum;

third recording level detection means for detecting a third recording level of the second signal when the second signal amount detected by the second signal amount detection means decreases by a predetermined level from the maximum, the level being smaller than the second recording level;

optimum recording level arithmetic means for assigning priorities to the first to third recording levels detected by the recording level detection means for weighting and finding an optimum recording level of the second signal by calculation; and optimum recording level storage means for storing the optimum recording level found by the arithmetic means, wherein recording current of the second recording head is controlled based on the optimum recording level stored in the storage means.

(2) According to a second aspect of invention, the automatic recording current controller according to the first aspect may comprise third recording level detection means for detecting a third recording level of the second signal when the second signal amount detected by the second signal amount detection means becomes a predetermined amount, the level being smaller than the second recording level, in place of the third recording level detection means according to the first aspect.

(3) Accroding to a third aspect of the invention, the automatic recording current controller according to the first or second aspect may comprise first recording level detection means for detecting a first recording level of the second signal when the first signal amount detected by the first signal amount detection means becomes equal to or greater than a first preset value, and further include fourth recording level detection means for detecting a fourth recording level of the second signal when the first signal amount detected by the first signal amount detection means becomes equal to or greater than a second value less than the first value, in place of the first recording level detection means according to the first or second aspect, wherein the optimum recording level arithmetic means may assign priorities to the first to fourth recording levels detected by each recording level detection means for weighting and find an optimum recording level of the second signal by calculation.

(4) According to a fourth aspect of the invention, in the automatic recording current controller according to the first or second aspect, the magnetic recorder is a helical scan magnetic recorder which has a first recording head group consisting of two or more first recording heads and a second recording head group consisting of two or more second recording heads and is capable of double magnetic recording such that a first signal is recorded in a deep portion of a magnetic recording medium through the first recording head group and then a second signal is recorded in a surface portion of the magnetic recording medium through the second magnetic head group, the recording level changing means is means for changing a recording level, when the second signal is recorded through the second recording head group, separately for each of the second recording heads in the second recording head group, the first to third recording level detection means are means for detecting the first to third recording levels of the second signal separately for each of the second recording heads, the optimum recording level arithmetic means is means for assigning priorities to the first to third recording levels detected separately for each of the second recording heads by the recording level detection means for weighting and finding the optimum recording level of the second signal separately for each of the second recording heads by calculation, and the optimum recording level storage means is means for storing the optimum recording level for each of the second recording heads found by the optimum recording level arithmetic means, whereby recording current of each of the second recording heads in the second recording head group can be controlled separately based on each optimum recording level stored in the storage means.

(5) According to a fifth aspect of the invention, in the automatic recording current controller according to the third aspect, the magnetic recorder is a helical scan magnetic recorder which has a first recording head group consisting of two or more first recording heads and a second recording head group consisting of two or more second recording heads and is capable of double magnetic recording such that a first signal is recorded in a deep portion of a magnetic recording medium through the first recording head group and then a second signal is recorded in a surface portion of the magnetic recording medium through the second magnetic head group, the recording level changing means is means for changing a recording level, when the second signal is recorded through the second recording head group, separately for each of the second recording heads in the second recording head group, the first to fourth recording level detection means are means for detecting the first to fourth recording levels of the second signal separately for each of the second recording heads, the optimum recording level arithmetic means is means for assigning priorities to the first to fourth recording levels detected separately for each of the second recording heads by the recording level detection means for weighting and finding the optimum recording level of the second signal separately for each of the second recording heads by calculation, and the optimum recording level storage means is means for storing the optimum recording level for each of the second recording heads found by the optimum recording level arithmetic means, whereby recording current of each of the second recording heads in the second recording head group can be controlled separately based on each optimum recording level stored in the storage means.

(6) According to a sixth aspect of the invention, in each automatic recording current controller of a magnetic recorder according mentioned above, the recording level changing means may be means for changing a recording level step-wise when the second signal is recorded through the second recording head, may further include control signal recording means for changing a duty ratio of a control signal and recording the control signal on the magnetic recording medium in synchronization with changing the recording level by the recording level changing means, and means for reproducing the recorded control signal from the magnetic recording medium, detecting the duty ratio of the control signal, and using the duty ratio as an address of the recording level changed step-wise and recorded.

(7) According to a seventh asepct of the invention, in the automatic recording current controller according to the first, second, or fourth aspect, the first signal may be a high-fidelity audio signal, may further include means for reproducing and demodulating the high-fidelity audio signal recorded in the deep portion of the magnetic recording medium through the first recording head, determining a level of a noise component contained in the demodulated reproduced audio signal, and outputting a high-fidelity/linear switch control signal for switching an audio signal to be output between a high-fidelity audio signal and a linear audio signal, and reference value setting means for automatically setting the reference value of the first recording level detection means based on the level of the reproduced audio signal just before the high-fidelity to linear transition of the high-fidelity/linear switch control signal is made by the means.

According to the automatic recording current controller of the magnetic recorder of the first aspect, the recording level changing means changes a recording level when the second signal is recorded on a magnetic recording medium through the second recording head, and the first and second signal amount detection means detect the amount of the first signal recorded in the deep portion of the magnetic recording medium and the amount of the second signal recorded in the surface portion of the magnetic recording medium.

The first to third recording level detection means detect the first recording level of the second signal when the first signal amount detected by the first signal amount detection means becomes equal to or greater than a preset reference value, the second recording level of the second signal when the second signal amount detected by the second signal amount detection means reaches the maximum, and the third recording level of the second signal when the second signal amount detected by the second signal amount detection means decreases by a predetermined level from the maximum, the level being smaller than the second recording level, respectively.

The optimum recording level arithmetic means assigns priorities to the first to third recording levels detected by the recording level detection means for weighting, finds an optimum recording level of the second signal by calculation, and stores it in the optimum recording level storage means. The recording current of the second recording head is controlled based on the stored optimum recording level.

Therefore, the recording level of the second signal can be automatically set to the optimum one to control the recording current of the second recording head so that the first and second signals are always reproduced at proper levels regardless of the type, recording and reproducing characteristics, etc., of magnetic recording media to be used.

The automatic recording current controller of the second aspect is the same as that of the first aspect in function except that the third recording level detection means detects the level of the second signal when the second signal amount detected by the second signal amount detection means becomes a predetermined amount, the level being smaller than the second recording level, as the third recording level.

According to the automatic recording current controller of the third aspect, the first recording level detection means detects, as the first recording level, the level of the second signal when the first signal amount detected by the first signal amount detection means becomes equal to or greater than a first preset value, and the fourth recording level detection means detects, as the fourth recording level, the level of the second signal when the first signal amount detected by the first signal amount detection means becomes equal to or greater than a second value less than the first value.

The optimum recording level arithmetic means assigns priorities to the first to fourth recording levels detected by the first to fourth recording level detection means for weighting and finds the optimum recording level of the second signal by calculation.

The automatic recording current controller is the same as that of the first aspect in other functions.

According to the automatic recording current controller of the fourth aspect, the magnetic recorder adopts helical scan and is capable of double magnetic recording such that the first signal is recorded in a deep portion of a magnetic recording medium through the first recording head group and then the second signal is recorded in a surface portion of the magnetic recording medium through the second magnetic head group.

The recording level changing means changes the recording level, when the second signal is recorded through the second recording head group, separately for each of the second recording heads in the second recording head group. The first to third recording level detection means detect the first to third recording levels of the second signal separately for each of the second recording heads.

The optimum recording level arithmetic means assigns priorities to the first to third recording levels detected separately for each of the second recording heads by the recording level detection means for weighting, finds the optimum recording level of the second signal separately for each of the second recording heads by calculation, and stores it in the optimum recording level storage means for each of the second recording heads.

The recording current of each of the second recording heads in the second recording head group is controlled separately based on each optimum recording level stored in the storage means. The automatic recording current controller is the same as that of the first aspect in other functions.

According to the automatic recording current controller of the fifth aspect, the first to fourth recording level detection means detect the first to fourth recording levels of the second signal separately for each of the second recording heads in the second recording head group, and the optimum recording level arithmetic means assigns priorities to the first to fourth recording levels detected separately for each of the second recording heads by the recording level detection means for weighting, finds the optimum recording level of the second signal separately for each of the second recording heads by calculation, and stores it in the optimum recording level storage means for each of the second recording heads.

The automatic recording current controller is the same as that of the fourth aspect in other functions.

According to the automatic recording current controller of the sixth aspect, the recording level changing means changes the recording level step-wise when the second signal is recorded on a magnetic recording medium through the second recording head, and the control signal recording means changes the duty ratio of a control signal and records the control signal on the magnetic recording medium in synchronization with changing the recording level.

The recorded control signal is reproduced from the magnetic recording medium and the duty ratio of the control signal is detected and used as an address of the recording level changed step-wise and recorded.

Therefore, the address when the video signal was recorded can be determined with high accuracy at reproduction according to the duty ratio of the control signal, and the recording level can also be recognized accurately. The automatic recording current controller is the same as each automatic recording current controller mentioned above in other functions.

According to the automatic recording current controller of the seventh aspect, the high-fidelity audio signal recorded as the first signal in the deep portion of a magnetic recording medium through the first recording head is reproduced and demodulated, the level of a noise component contained in the demodulated reproduced audio signal is determined, and a high-fidelity/linear switch control signal for switching an audio signal to be output between a high-fidelity audio signal and a linear audio is output.

The reference value setting means automatically sets the reference value of the first recording level detection means based on the level of the reproduced audio signal just before the high-fidelity to linear transition of the high-fidelity/linear switch control signal is made. Therefore, the reference value of the first recording level detection means can be automatically set to a proper value not degrading the reproduced audio signal.

The automatic recording current controller is the same as that of the first, second or fourth aspect in other functions.

BRIEF DESCRIPTION OF THE DRAWINGS

FIG. 4 is a flowchart showing the recording current tuning operation according to the first embodiment shown in FIGS. 1 to 3;

FIGS. 5A–5D are timing charts for explaining the operation of the first embodiment;

FIGS. 6A–6D are timing charts showing a recorded signal on magnetic tape and its reproduction operation in the first embodiment;

FIGS. 7A–7D are timing charts showing a first example of the optimum recording level detection operation according to the first embodiment;

FIG. 20 is a block circuit diagram of fifth embodiment of the invention showing only parts corresponding to the reproduction system audio circuit in FIG. 3.

DETAILED DESCRIPTION OF THE PREFERRED EMBODIMENTS

Referring now to the accompanying drawings, preferred embodiments of the present invention will be described.

A magnetic recorder of a first embodiment of the invention is a helical scan type and VHS video tape recorder (VTR) and adopts a double recording system which records a high-fidelity audio signal as a first signal in the deep portion of a magnetic tape, then records a video signal as a second signal in the surface portion of the magnetic tape.

Figure 1:
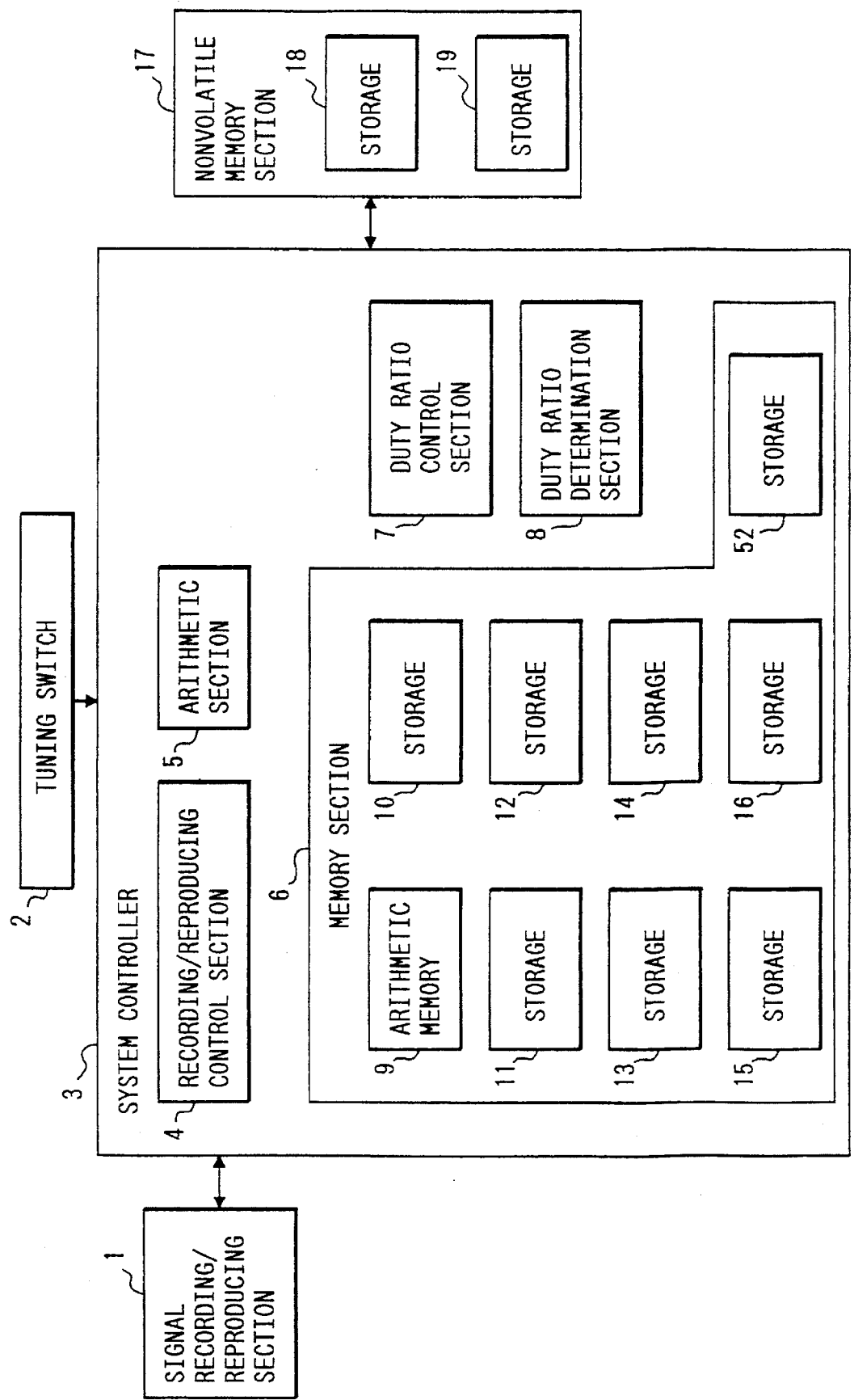
FIG. 1 is a block diagram of an automatic recording current controller showing a first embodiment of the invention.

FIG. 1 shows the main configuration of an automatic recording current controller of the magnetic recorder of the first embodiment. FIG. 2 shows a memory section 6 and a nonvolatile memory section 17 in FIG. 1 in detail.

As shown in FIG. 1, the embodiment is configured centering on a system controller (using a microcomputer consisting of a CPU, ROM, RAM, etc.,) 3 for controlling drive of the mechanism of the VTR.

The system controller 3 is provided with functional sections of a recording/reproducing control section 4, an arithmetic section 5, a record control signal duty ratio control section 7, and a reproduction control signal duty ratio determination section 8 in addition to the functional section as a normal mechanism controller.

Figure 2A:
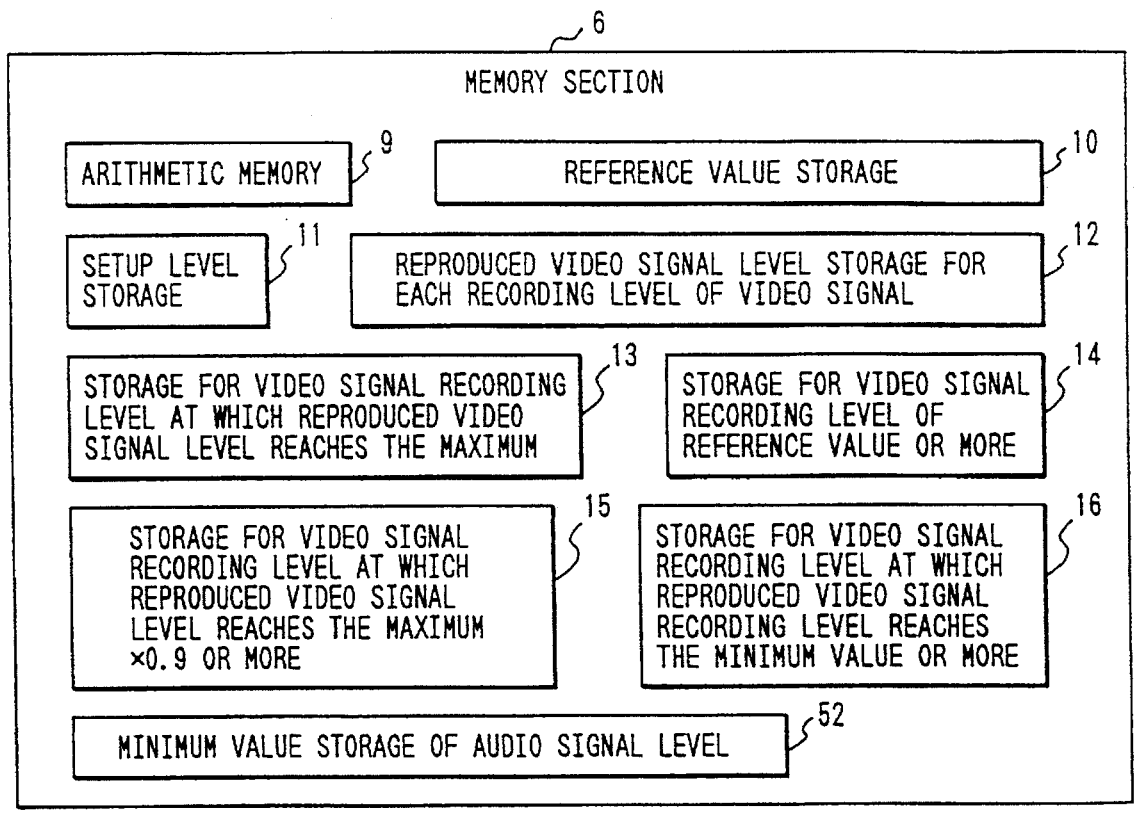
FIG. 2(a) is a block diagram showing a memory section in detail in the first embodiment.
Figure 2B:
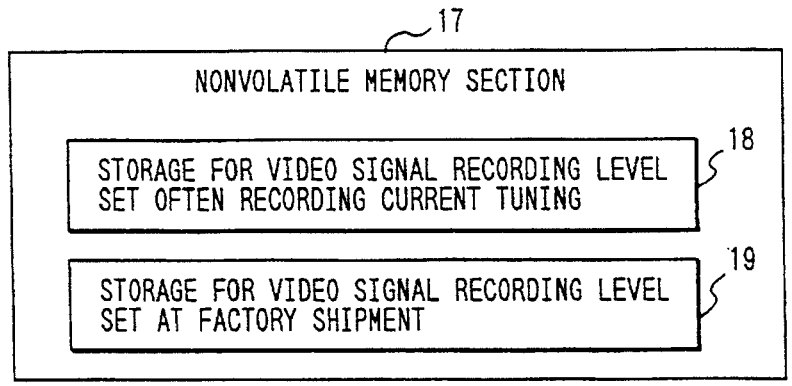
FIG. 2(b) is a block diagram showing a nonvolatile memory section in detail in the first embodiment.

A memory section 6 in the system controller 3 contains an arithmetic memory 9, a reference value storage 10, a setup level storage 11, a reproduced video signal level storage 12 for each recording level of video signal, a recording level storage 13 for a video signal recording level at which the reproduced video signal level reaches the maximum, a recording level storage 14 for a video signal recording level of reference value or more, a recording level storage 15 for a video signal recording level at which a reproduced video signal level reaches the maximum×0.9 or more, a recording level storage 16 for a video signal recording level at which a reproduced video signal level reaches the minimum value or more, and a minimum value storage 52 of an audio signal level, as shown in detail in FIG. 2(a).

Further, a recording current tuning switch 2, a signal recording/reproducing section 1, and a nonvolatile memory section 17 are connected to the system controller 3, as shown in FIG. 1. The nonvolatile memory section 17 contains a storage 18 for a video signal recording level set after recording current tuning and a storage 19 for a video signal recording level set at factory shipment, as shown in detail in FIG. 2(b).

Next, the functions of the sections will be described in detail.

First, the recording/reproducing control section 4 of the system controller 3 has functions of determining the operation mode when the recording current tuning switch 2 is handled and controlling the signal record and reproduction for recording current tuning. The arithmetic section 5 uses reproduced signals and data of the reference values, recording levels, etc., stored in the memory section 6 to perform predetermined operations and processing such as comparison.

The arithmetic memory 9 of the memory section 6 is a memory area used for processing of the arithmetic section 5. The reference value storage 10 stores audio signal reference values. The setup level storage 11 stores the optimum recording level of video signal provided by recording current tuning. The reproduced video signal level storage 12 stores the reproduced video signal level for each recording level.

The recording level storage 13 stores the video signal recording level at which the reproduced video signal level reaches the maximum. The recording level storage 14 stores the video signal recording level at which the reproduced audio signal level becomes the level equal to or greater than and nearest to the reference value. The recording level storage 15 stores the video signal recording level at which the reproduced video signal level becomes the maximum level×0.9 or more and nearest to the maximum level×0.9.

The recording level storage 16 stores the video signal recording level at which the reproduced audio signal level becomes the level equal to or greater than and nearest to the minimum value.

The recording current tuning switch 2 is used to specify the recording current tuning operation. The signal recording/reproducing section 1 records and reproduces a recording current tuning signal on a magnetic tape (not shown) based on an instruction of the system controller 3; it is configured as a general VTR.

The recording level storages 18 and 19 of the nonvolatile memory section 17 store the video signal recording levels after recording current tuning and at factory shipment.

Next, the signal recording/reproducing section 1 will be furthermore discussed with reference to FIG. 3.

First, the recording system of an audio signal recorded in the deep portion of a magnetic tape will be described. At recording, an audio signal converted into an FM signal by a recording system audio circuit 35 is output and amplified by a record amplifier 36, then supplied to an audio head 38 on channel 1 and an audio head 39 on channel 2, which are first recording heads, as recording current and recorded in the deep portion of a magnetic tape (not shown).

At the time, the system controller 3 makes a switch 37 open and turns on switches 40 and 41. The audio signal recording current is constant.

At reproducing, the system controller 3 turns on the switch 37 and makes the switches 40 and 41 open. Minute signals reproduced through the audio heads 38 and 39 from the magnetic tape are amplified by a head amplifier 42 on channel 1 and a head amplifier 43 on channel 2.

Since the VTR adopts helical scan, a switch 44 is switched to the signal reproducing channel. The reproduced audio signal provided via the switch 44 is input to a reproducing system audio circuit 46 and a reproduced signal detector 45.

The audio signal demodulated by the reproducing system audio circuit 46 is output as an audio signal as well known. The reproduced signal detector 45 detects the input reproduced audio signal and converts it into a direct current (DC) voltage. For this converted voltage signal, the response speed of the reproduced signal detector 45 is determined so that the reproduced signal amount for each channel can be identified. The converted DC voltage is input to an A/D input port of the system controller 3 and the reproduced audio signal level is read for each channel by the system controller 3.

Next, the recording system of a video signal recorded in the surface portion of a magnetic tape will be described.

A recording system video circuit 21 outputs a video signal on which a frequency-converted chroma signal is overlapped with an FM luminance signal. The video signal is input to a record AGC amplifier 22, which then amplifies and outputs it to a video head 24 on channel 1 and a video head 25 on channel 2, which are second recording heads, as always constant recording current independently of input video signal level variations or inductance variations of the video heads 24 and 25. The signal is recorded in the surface portion of the magnetic tape (not shown) through the video heads 24 and 25.

In the recording state, the system controller 3 makes a switch 23 open and turns on switches 26 and 27, and the current flowing into the video heads 24 and 25 is converted into a voltage by an I-V converter 28 and the voltage is input to an AGC detector 29.

On the other hand, reference voltages V1 and V2 are output so that the video signal recording level can be set for each channel by the system controller 3, and are switched by a switch 20 in synchronization with the video head 24 or 25 through which the video signal is actually recorded on the magnetic tape as well known for being input to the AGC detector 29. However, at recording current tuning, the same voltage is used for control.

The AGC detector 29 compares the voltage from the I-V converter 28 with the reference voltage V1, V2 for controlling a gain of the record AGC amplifier 22. Therefore, the amplification gain of the record AGC amplifier 22 can be changed by changing the reference voltage V1, V2.

At reproducing, the system controller 3 turns on the switch 23 and makes the switches 26 and 27 open, and minute signals reproduced through the video heads 24 and 25 from the magnetic tape are amplified by a head amplifier 30 on channel 1 and a head amplifier 31 on channel 2. As described above, since the VTR adopts helical scan, a switch 32 is switched to the head amplifier 30 or 31 on the signal reproducing channel. One of the reproduced video signals passed through the switch 32 is demodulated by a reproducing system video circuit 34 and the other is converted into a DC voltage by a reproduced signal detector 33.

In this case, the capacitance of a capacitor determining the response speed of the reproduced signal detector 33 is determined so that the reproduced signal amount can be identified for each channel. The DC voltage is input to an A/D input port of the system controller 3 and the reproduced video signal level is read by the system controller 3 for each channel.

Next, the control signal system will be discussed.

At recording at recording current tuning, a control signal whose duty is changed by the system controller 3 is input to a record amplifier 47 and a recording current is supplied to a control head 49 for recording the control signal along the running direction of the magnetic tape as well known with home VTRs. At the time, the system controller 3 makes a switch 48 open and turns on a switch 50.

At reproducing, the system controller 3 turns on the switch 48 and makes the switch 50 open, and a minute control signal reproduced through the control head 49 from the magnetic tape is amplified by a head amplifier 51 and input to the system controller 3, which then determines the duty ratio.

Next, the operation of the embodiment thus configured will be discussed.

FIG. 4 is a flowchart of the recording current tuning operation according to the embodiment.

<Recording of Recording Current Tuning Video Signal and Audio Signal>

First, the signal recording operation at steps S1 to S6 in FIG. 4 will be discussed.

When the recording current tuning switch 2 is handled at step S1, the recording/reproducing control section 4 of the system controller 3 senses it and makes the recording current tuning mode selected at step S2. The signal recording/reproducing section 1 starts signal recording for recording current tuning for magnetic tape based on the operation of the recording/reproducing control section 4 at step S3.

At the recording, the reference voltages V1 and V2 are changed step-wise at the same time and the video signal recording level is changed from the minimum to the maximum at step S4. The duty ratio of control signal is changed in synchronization with changing the video signal recording level and the control signal is recorded at step S5.

The operation of steps 4 and 5 will be discussed in detail with reference to a signal recording timing chart in FIG. 5.

Figure 3:
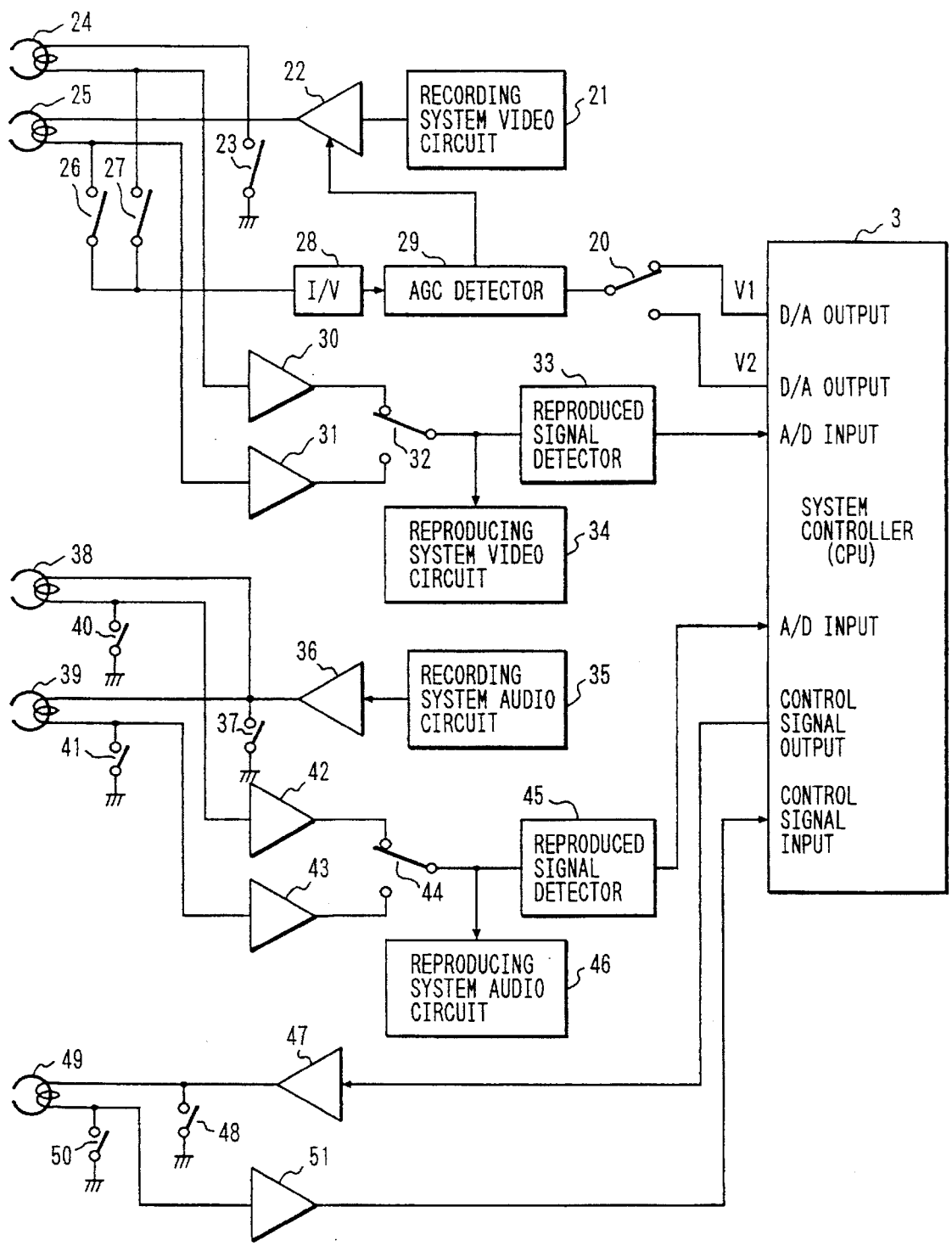
FIG. 3 is a block circuit diagram showing the configuration of a signal recording/reproducing section in FIG. 1 in detail.

First, a non-modulated carrier is output from the recording system audio circuit 35 in FIG. 3 based on an operation instruction given by the recording/reproducing control section 4 of the system controller 3. It is input to the record amplifier 36 and a constant recording current is supplied to the audio heads 38 and 39 for recording in the deep portion of magnetic tape [FIG. 5 (A)].

Figure 5D:
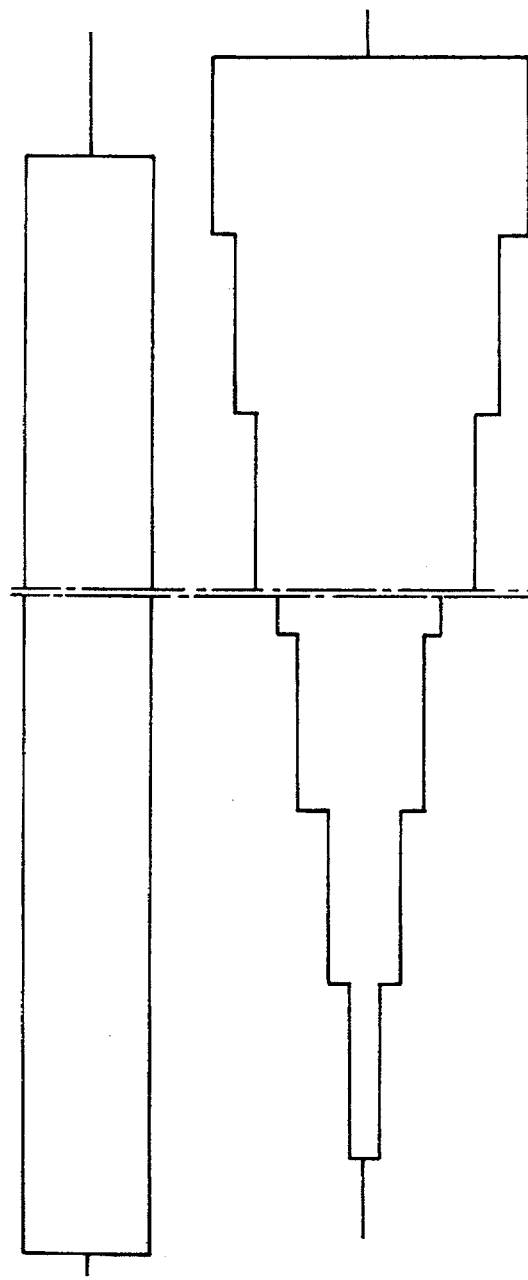
Figure 8A:
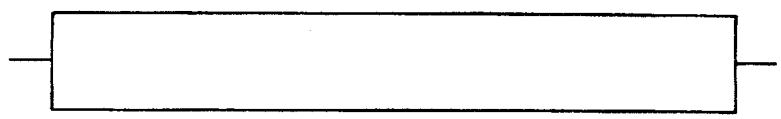
FIGS. 8A–8D are timing charts showing a second example of the optimum recording level detection operation according to the first embodiment.
Figure 8B:
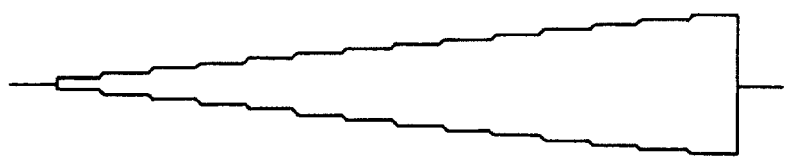
Figure 8C:
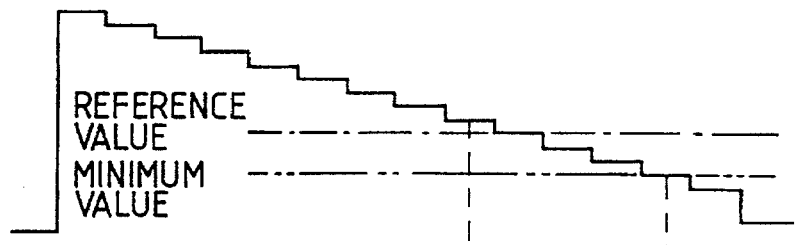
Figure 8D:
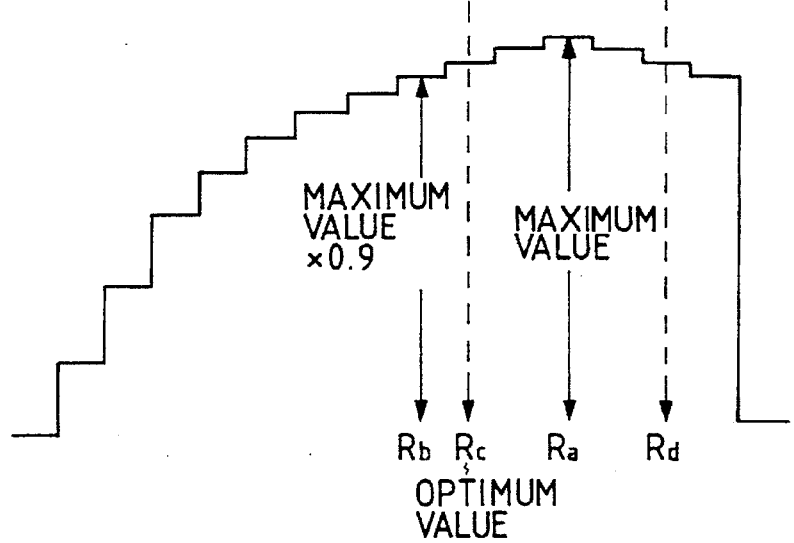
Figure 9A:
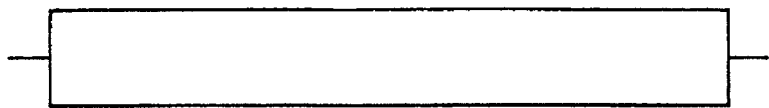
FIGS. 9A–9D are timing charts showing a third example of the optimum recording level detection operation according to the first embodiment.
Figure 9B:
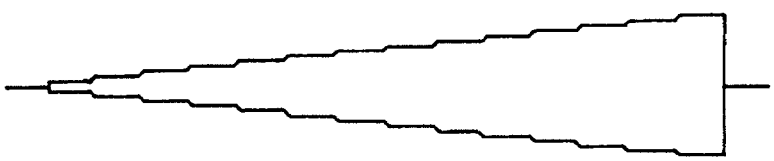
Figure 9C:
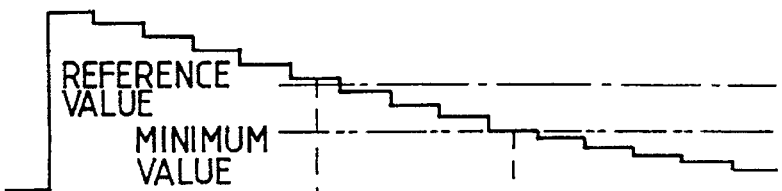
Figure 9D:
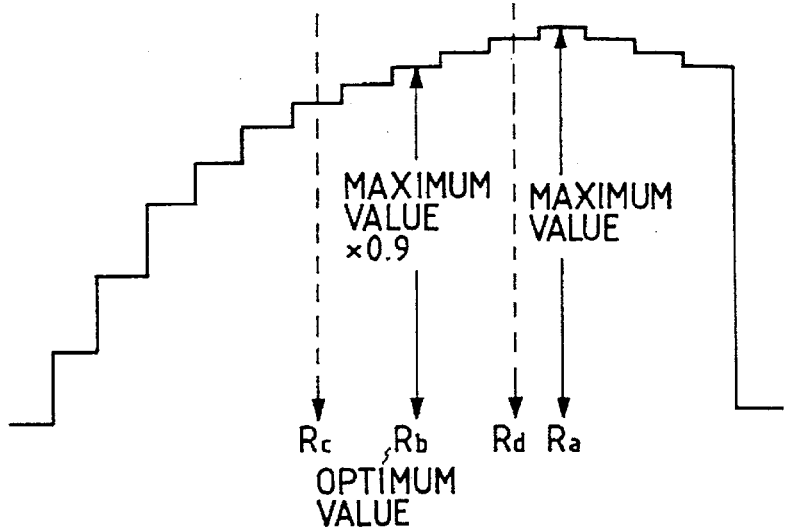
Figure 10A:
FIGS. 10A–10D are timing charts showing a fourth example of the optimum recording level detection operation according to the first embodiment.
Figure 10B:
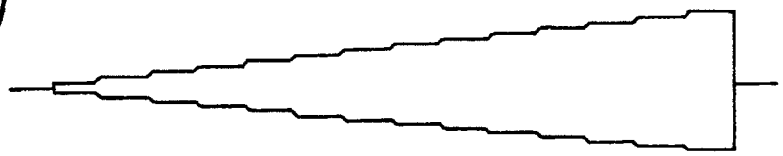
Figure 10C:
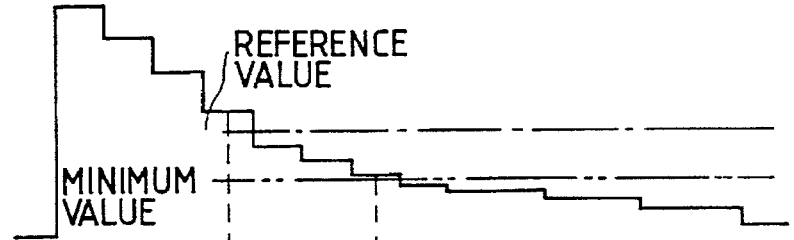
Figure 10D:
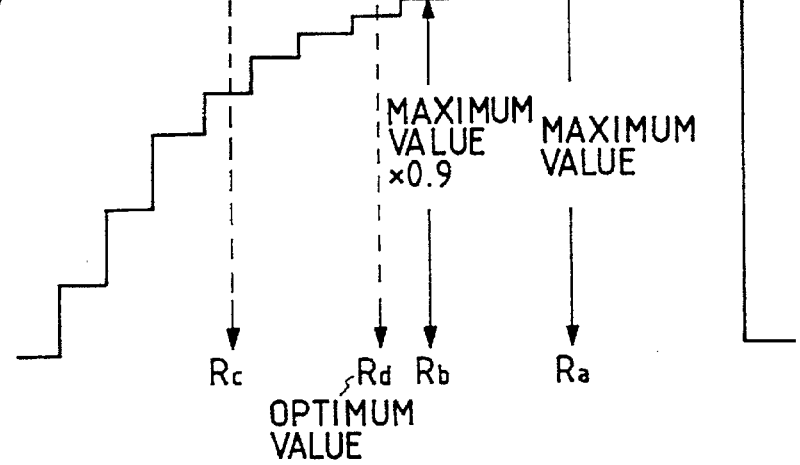

Video signal recording is started with a proper delay after the audio signal recording starts [FIG. 5 (B)].

First, the reference voltage V1, V2 output from the recording/reproducing control section 4 of the system controller 3 is input through the switch 20 to the AGC detector 29 and the recording level is changed step-wise so that it increases in order every six frames.

In this case, a non-modulated carrier is output from the recording system video signal 21 to the record AGC amplifier 22, and is supplied to the video head 24, 25 as recording current and recorded in the surface portion of the magnetic tape.

The recording control signal duty ratio control section 7 of the system controller 3 changes the duty ratio of the control signal, for example, from 60% to 10% to the video signal recording start position and then from 10% to 20% to 30% . . . to 80% over eight steps every six frames in synchronization with the video signal recording start and the timing at which the recording level changes every six frames [FIG. 5 (C)]. The changed control signal is input to the record amplifier 47 and output current thereof is supplied to the control head 49 through which the control signal is recorded on the magnetic tape.

Recording the recording current tuning video signal and audio signal is now complete at step S6.

<Reproducing of Recorded Recording Current Tuning Video and Audio Signals>

Next, the reproducing operation of signals recorded on the magnetic tape as described above will be discussed with steps S7 and S8 in FIG. 4.

First, the signal recording/reproducing section 1 rewinds the magnetic tape to the signal recording start point based on an instruction of the recording/reproducing control section 4 of the system controller 3 at step S7. The recorded video and audio signals are reproduced at step S8.

The operation will be described in detail. Upon completion of the signal recording, the system controller 3 places the control signal system in the reproduction mode and operates the head amplifier 51.

When the tape is rewound, while the reproduction control signal duty ratio determination section 8 of the system controller 3 reads the duty ratio of control signal, the rewind operation is stopped at the position where the duty ratio changes from 10% to 60%, and the mode is changed to the reproduction mode.

In the reproduction mode, the duty ratio of the control signal is always read, thus the address when the video signal was recorded can be determined with high accuracy at the reproduction and the recording level at the time can also be recognized accurately.

When the reproduction mode is entered, video and audio signals previously recorded on the magnetic tape are reproduced.

The reproduction operation of magnetic tape recorded with a recording current of one setup value corresponding to one step when the recording level is changed step-wise and the video signal is recorded as described above in the recording current tuning mode will be discussed with reference to FIG. 6 too.

The one setup value consists of six frames and 12 fields. Since the video and audio signals are recorded as shown in FIG. 6(B) in helical scan, the video signal is reproduced through the video heads 24 and 25 and amplified by the head amplifiers 30 and 31 at reproduction.

The switch 32 is switched to the head amplifier 30 or 31 on the video signal output channel, providing completely reproduced video signal, which is input to the reproduced signal detector 33.

Since the response speed of the reproduced signal detector 33 is set to sufficiently high speed as described above, if the input video signal contains a level difference for each channel, it is converted into DC voltage with the level difference kept, and the DC voltage is input to the A/D input port of the system controller 3. FIG. 6(C) shows the output of the reproduced signal detector 33.

The output of the reproduced signal detector 33 input to the system controller 3 is identified for each channel according to the level difference and 6-field output corresponding to the one setup value is averaged for each channel.

Thus, the effect of a scratch etc. on the magnetic tape is minimized by averaging for each channel.

Likewise, the audio signal is reproduced through the audio heads 38 and 39 and amplified by the head amplifiers 42 and 43 for each channel. The switch 44 is switched to the head amplifier 42 or 43 on the signal output channel, providing a completely reproduced audio signal, which is input to the reproduced signal detector 45.

Since the response speed of the reproduced signal detector 45 is set to sufficiently high speed like the reproduced signal detector 33, if the input audio signal contains a level difference for each channel, it is converted into DC voltage with the level difference kept, and the DC voltage is input to the A/D input port of the system controller 3. FIG. 6(D) shows the output of the reproduced signal detector 45.

The output of the reproduced signal detector 45 input to the system controller 3 is identified for each channel according to the level difference and 6-field output corresponding to the one setup value is averaged for each channel.

Thus, the effect of a scratch etc. on the magnetic tape is minimized by averaging for each channel.

<Detection of Optimum Recording Level>

Next, the operation of detecting the optimum recording level of video signal from signals thus reproduced will be discussed with steps S9 and later in FIG. 4.

First, the reproduced video signal level averaged for each channel for each recording level is stored in the reproduced video signal level storage 12 in the memory section 6 of the system controller 3 at step S9.

Next, the arithmetic section 5 compares the reproduced video signal levels stored in the storage 12 for detecting the maximum level, and stores the recording level when the maximum level is reached, in the recording level storage 13 for each channel at step S10.

The arithmetic section 5 compares the maximum level with each reproduced video signal level in the storage 12 and stores the video signal recording level at which the reproduced video signal level is equal to or greater than and nearest to the maximum level×0.9, less than the video signal recording level stored in the storage 13, in the recording level storage 15 for each channel at step S11.

The arithmetic section 5 compares the audio signal reference value with the reproduced audio signal level and stores the video signal recording level at which the reproduced audio signal level is equal to or greater than and nearest to the reference value, in the recording level storage 14 for each channel at step S12.

At the same time, the arithmetic section 5 compares the amount in which the quality of the reproduced audio signal is impaired due to C/N (carrier/noise) degradation, namely, the minimum value with the reproduced audio signal level and stores the video signal recording level at which the reproduced audio signal level is equal to or greater than and nearest to the minimum value, in the recording level storage 16 for each channel at step S13.

Next, the optimum recording level is found from the four types of video signal recording levels. FIGS. 7 to 10 show four possible examples for this purpose. In the figures, audio signal recording current is shown in FIGS. 7(A) to 10(A), video signal recording current is shown in FIGS. 7(B) to 10(B), reproduced audio signal example is shown in FIGS. 7(C) to 10(C), and reproduced video signal example is shown in FIGS. 7(D) to 10(D).

Assume that the video signal recording level stored at step S10 in FIG. 4 is Ra, that the video signal recording level stored at step S11 is Rb, that the video signal recording level stored at step S12 is Rc, and that the video signal recording level stored at step S13 is Rd.

Since Ra<Rc in the example shown in FIGS. 7(A) to 7(D), the optimum recording level becomes Ra. At the recording level Ra, the reproduced video signal level reaches the maximum and the reproduced audio signal level becomes greater than the reference value.

Since Rb<Rc<Ra in the example shown in FIGS. 8(A) to 8(D), the optimum recording level becomes Rc. At the recording level Rc, the reproduced video signal level does not become the maximum value, but is the maximum level×0.9 or more and remarkable picture quality degradation is not involved as compared with the maximum level, thus it is within the allowable range. The reproduced audio signal level exceeds the reference value.

Since Rc<Rb<Rd<Ra in the example shown in FIGS. 9(A) to 9(D), the optimum recording level becomes Rb. At the recording level Rb, the reproduced video signal level does not become the maximum level, but is the maximum level×0.9 and remarkable picture quality degradation is not involved as compared with the maximum level, thus it is within the allowable range. The reproduced audio signal level is less than the reference value, but greater than the minimum value and is within the allowable range.

Since Rc<Rd<Rb<Ra in the example shown in FIGS. 10(A) to 10(D), the optimum recording level becomes Rd. At the recording level Rd, the reproduced video signal level becomes the maximum level ×0.9 or less and falls below the allowable range, but the reproduced audio signal level exceeds the minimum value. Rd is adopted as the optimum recording level because it is considered that avoiding degradation of the sound quality of demodulated audio output is more practical even if the reproduced video image somewhat degrades.

The optimum recording level is thus detected at step S14 in FIG. 4. The found optimum recording level for each channel of the video heads 24 and 25 is stored in the setup level storage 11 of the memory section 6 of the system controller 3 and the video signal recording level storage 18 of the nonvolatile memory section 17 at step S15.

The system controller 3 drives the signal recording/reproducing section 1 for rewinding the tape to the signal recording start point, sets the recording pause state at step S16, and releases the recording current tuning mode at step S17. Then, processing such as normal picture recording can be executed as desired.

The setup level stored in the setup level storage 11 of the memory section 6 of the system controller 3 and the video signal recording level storage 18 of the nonvolatile memory section 17 is held until the magnetic tape is ejected.

The optimum video signal recording level found by recording current tuning with a reference tape at factory shipment is stored in the video signal recording level storage 19 of the nonvolatile memory section 17. Therefore, the optimum recording level is used until the user inserts magnetic tape and performs recording current tuning after the factory shipment.

Next, the advantage of detecting the optimum recording level for each channel of the video heads 24 and 25 and controlling the recording current as in the embodiment will be discussed with reference to FIGS. 11 and 12.

Figure 11A:
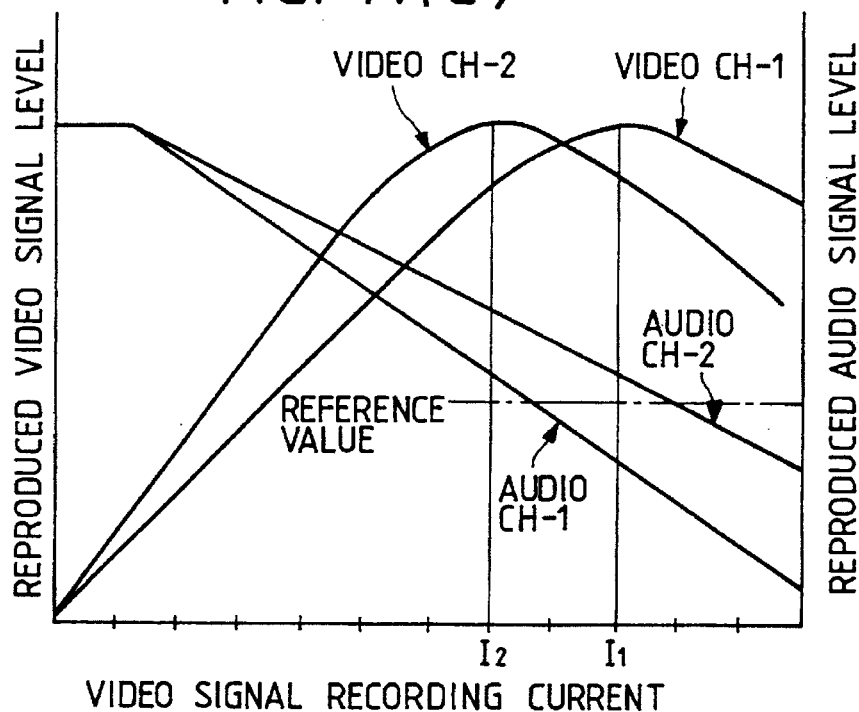
FIG. 11(a) is a graph showing video signal recording level vs. reproduced video signal and reproduced audio signal level characteristics for each channel in the first embodiment.

FIG. 11(a) shows video signal recording current vs. reproduced video signal and reproduced audio signal level characteristics and gives examples of reproduced video signal level curves for each video channel and reproduced audio signal level curves for each audio channel with respect to video signal recording current values on the horizontal axis.

Assume that audio signal is recorded in the deep portion of the magnetic tape through the audio head 38 on channel 1 (CH-1) and then video signal is recorded in the surface portion of the magnetic tape through the video head 25 on channel 2 (CH-2) and that audio signal is recorded in the deep portion of the magnetic tape through the audio head 39 on channel 2 (CH-2) and then video signal is recorded in the surface portion of the magnetic tape through the video head 24 on channel 1 (CH-1).

When the optimum recording current value (recording level) is determined for each channel, in the example shown in FIG. 7, the optimum recording current value at the video head 24 (video CH-1) becomes I1 and the optimum recording current value at the video head 25 (video CH-2) becomes I2; each becomes the recording current when the reproduced video signal level reaches the maximum.

Figure 11B:
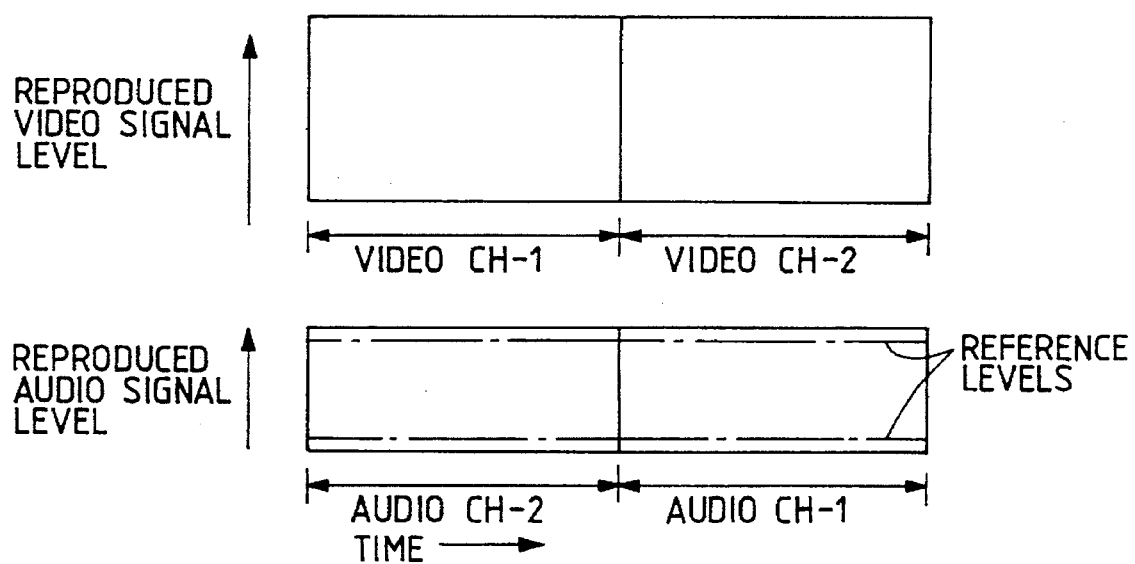
FIG. 11(b) is a timing chart of reproduced signal levels at setup recording levels in the first embodiment.

FIG. 11(b) shows the reproduced video signal and reproduced audio signal levels when the video CH-1 recording current value is I1 and the video CH-2 recording current value is I2.

From FIGS. 11(a) and 11(b), the reproduced signal levels become the maximum output values at both video CH-1 and video CH-2 and the reproduced signal levels are greater than the reference values at both the audio head 38 (audio CH-1) and the audio head 39 (audio CH-2).

Figure 12A:
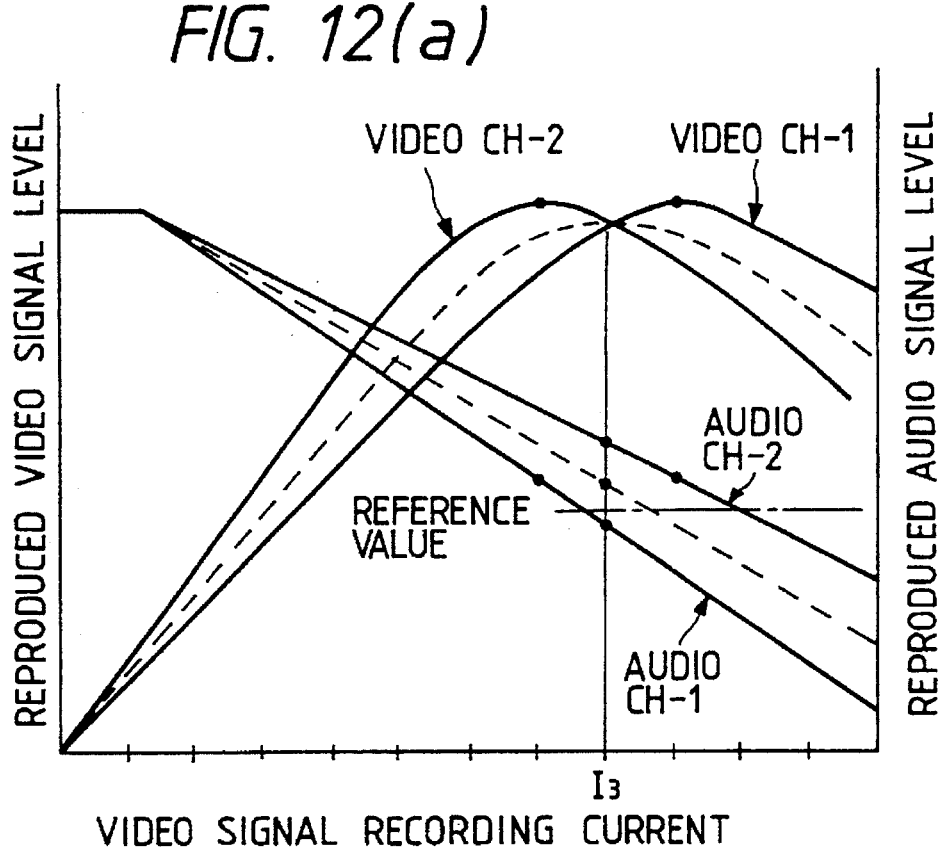
FIG. 12(a) is a graph showing video signal recording level vs. reproduced video signal and reproduced audio signal level and average characteristics for each channel in the first embodiment.

Like FIG. 11(a), FIG. 12(a) shows video signal recording current vs. reproduced video signal and reproduced audio signal level characteristics, wherein the recording current cannot be set separately for each of video CH-1 and video CH-2.

In this example, the optimum recording current value I is determined from the average value of the reproduced signal levels of video CH-1 and video CH-2 indicated by a broken line and the average value of the reproduced signal levels of audio CH-1 and audio CH-2 indicated by a broken line.

At this time, in the same case as that of FIG. 7, the optimum recording current value also becomes I3.

Figure 12B:
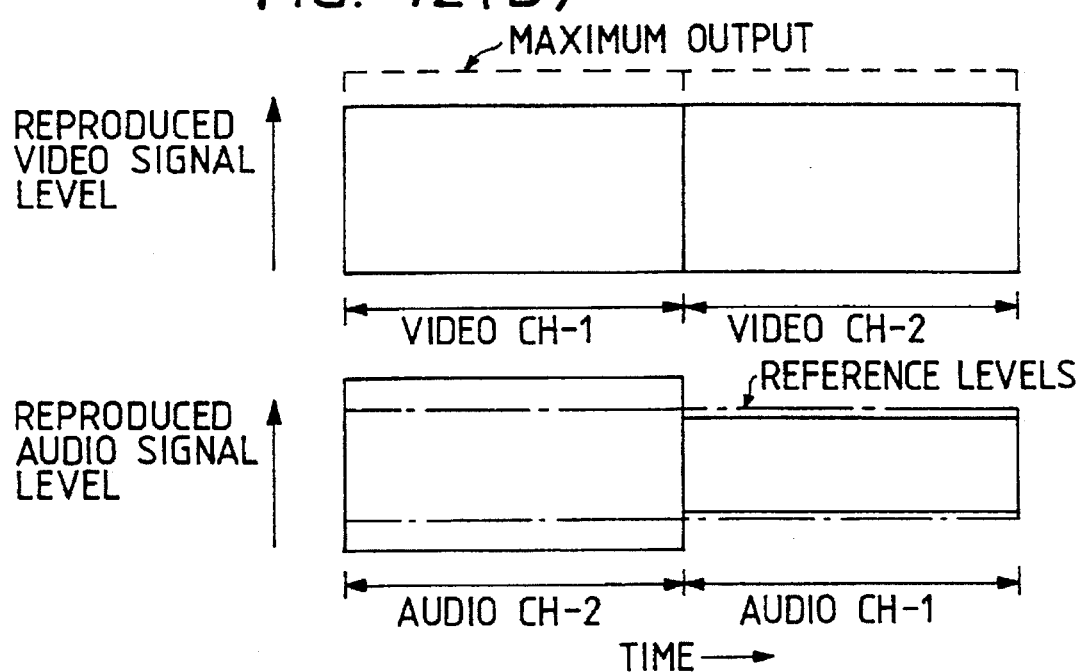
FIG. 12(b) is another timing chart of reproduced signal levels at setup recording levels in the first embodiment.

FIG. 12(b) shows the reproduced video signal and reproduced audio signal levels when the recording current values of video CH-1 and video CH-2 are I3. From FIGS. 12(a) and 12(b), the reproduced signal levels at both video CH-1 and video CH-2 become less than the maximum output value indicated by a broken line and the reproduced signal level at audio CH-1 becomes less than the reference value.

From FIGS. 11(A) to 12(B), it is understood that the maximum characteristic can be derived for each channel by detecting the optimum recording current for each channel and setting the optimum recording level for each channel.

Next, the advantage of the embodiment of the invention over the conventional example described in Japanese Patent Unexamined Publication No. Hei 5-197907 will be described.

Generally, the video signal recording current vs. reproduced video signal and reproduced audio signal level characteristics vary depending on the type of magnetic tape.

Figure 13:
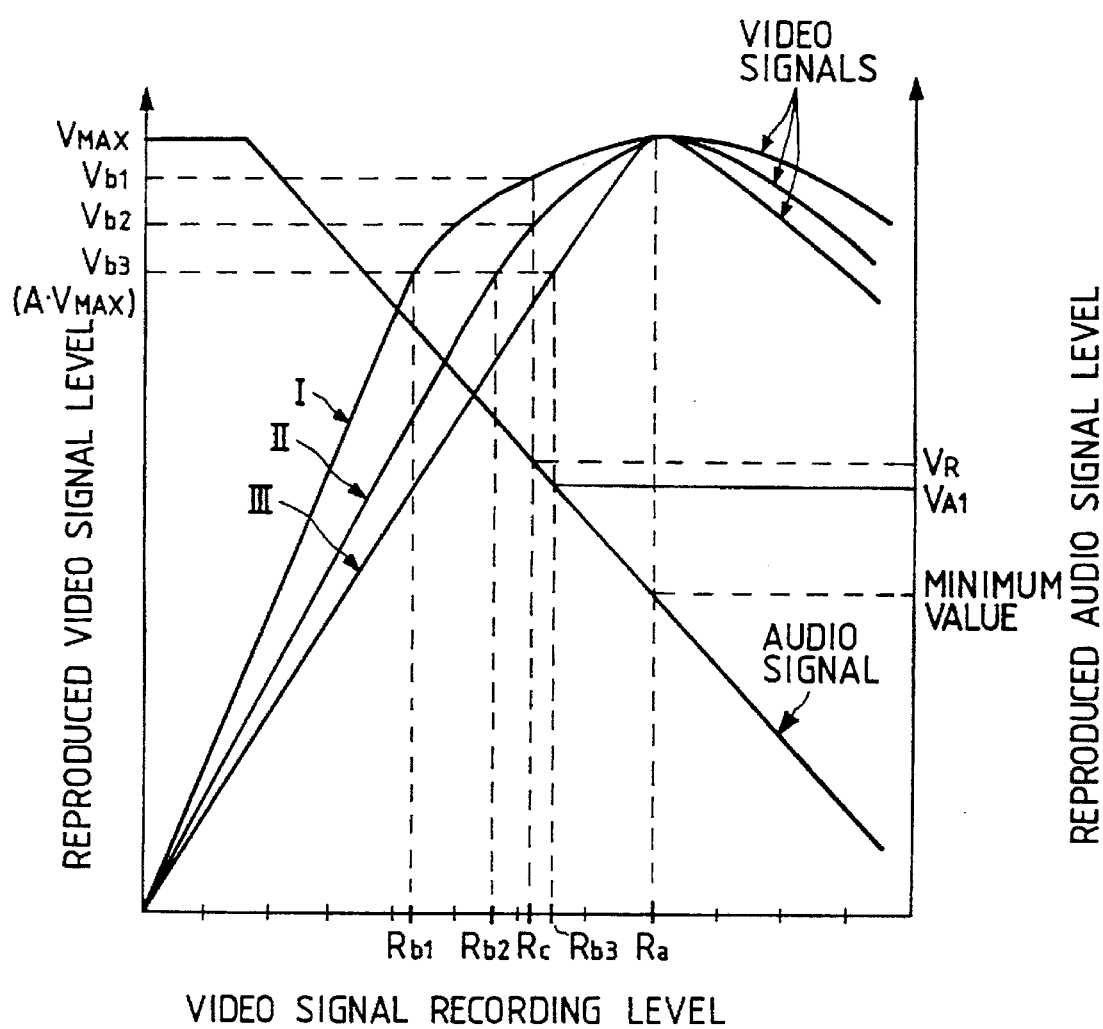
FIG. 13 is a characteristic chart for explaining the function of the first embodiment.
Figure 14:
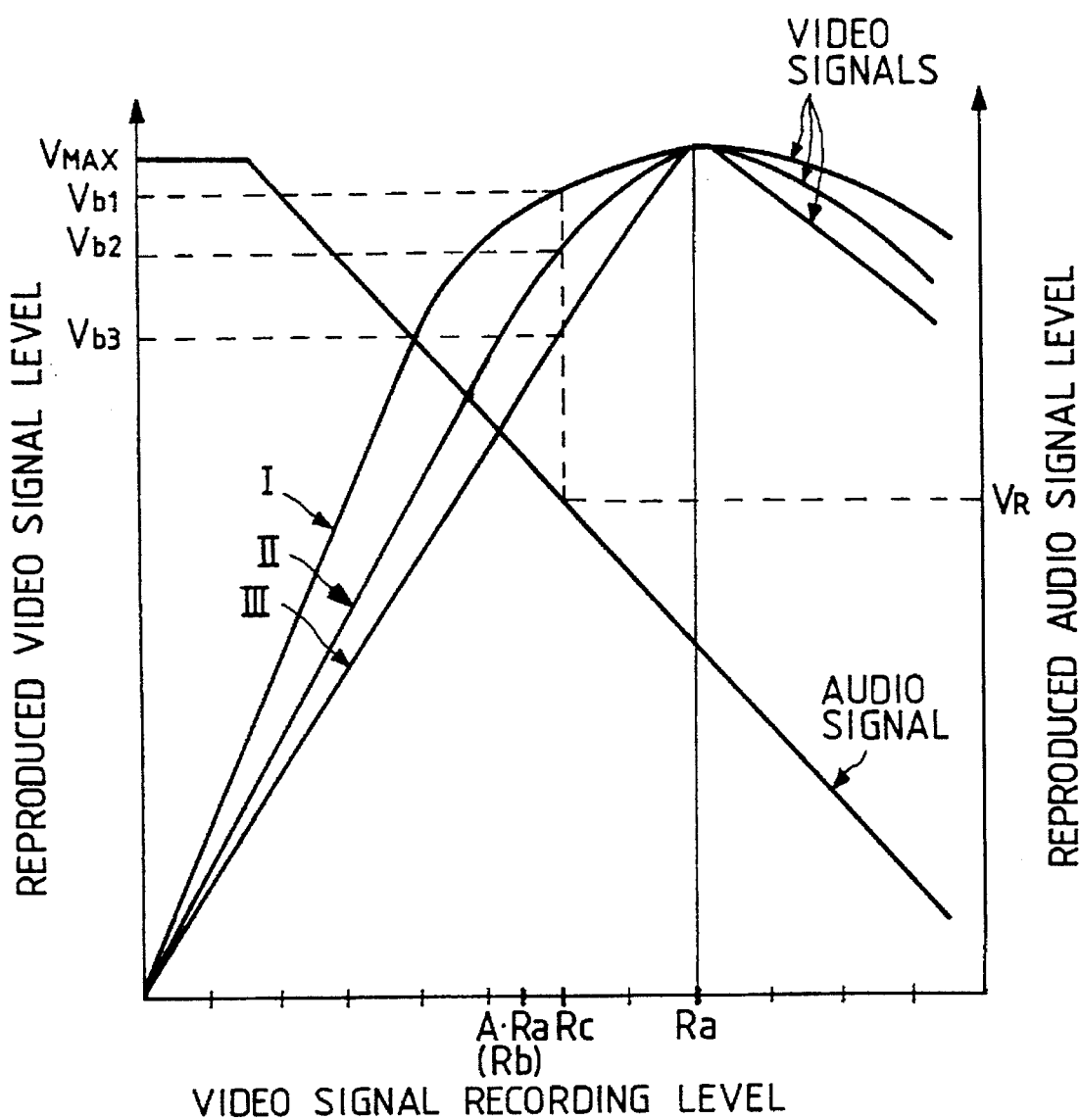
FIG. 14 is a characteristic chart for explaining the function of an example of a conventional automatic recording current controller.

FIG. 13 shows the video signal recording current vs. reproduced video signal and reproduced audio signal level characteristics when the optimum video signal recording level is set according to the embodiment of the invention. FIG. 14 shows the video signal recording current vs. reproduced video signal and reproduced audio signal level characteristics when the optimum video signal recording level is set according to the conventional example.

In the figures, I, II, and III denote the reproduced video signal level characteristics of magnetic tape I, magnetic tape II, and magnetic tape III respectively. For simplicity, the magnetic tapes I, II, and III are the same in the maximum levels (VMAX) of the reproduced video signals and in their video signal recording levels Ra.

The magnetic tapes I, II, and III also have the same reproduced audio signal level characteristics.

First, setting the optimum video signal recording level according to the embodiment of the invention will be described with reference to FIG. 13.

We have discussed the video signal recording level Rb in the embodiment as "the video signal recording level at which the reproduced video signal level becomes the maximum level×0.9 or more and nearest to the maximum level× 0.9." Here, assume that the constant 0.9 is A and that Rb is the video signal recording level at which the reproduced video signal level becomes maximum level VMAX·A, A<1. The video signal recording level Rb varies depending on the magnetic tape I, II, or III.

Rb of the magnetic tape I is represented as Rb1, that of the magnetic tape II as Rb2, and that of the magnetic tape III as Rb3.

For the magnetic tape I, Rb1<Rc<Ra. As in the example in FIG. 8, the optimum recording level becomes Rc, the reproduced video signal level becomes Vb1, and the reproduced audio signal level becomes reference value VR.

For the magnetic tape II, Rb2<Rc<Ra. Likewise, the optimum recording level becomes Rc, the reproduced video signal level becomes Vb2, and the reproduced audio signal level becomes the reference value VR.

For the magnetic tape III, Rc<Rb3<Ra. As in the example in FIG. 9, the optimum recording level becomes Rb3, the reproduced video signal level becomes Vb3 (A·VMAX), and the reproduced audio signal level becomes VA1 (VA1<VR).

Next, setting the optimum video signal recording level according to the conventional example will be described with reference to FIG. 14. Since Rb is the video signal recording level of A·Ra, A<1 for the recording level Ra at which the reproduced video signal level becomes the maximum level VMAX, if magnetic tapes I, II, and III are the same in the video signal recording level Ra, they become the same in A·Ra, namely, Rb.

For the magnetic tape I, A·Ra<Rc<Ra and A·Ra=Rb. Therefore, as in the example in FIG. 8, the optimum recording level becomes Rc, the reproduced video signal level becomes Vb1, and the reproduced audio signal level becomes the reference value VR. For the magnetic tape II, A·Ra<Rc<Ra and A·Ra=Rb. Therefore, the optimum recording level becomes Rc, the reproduced video signal level becomes Vb2, and the reproduced audio signal level becomes the reference value VR. For the magnetic tape III, A·Ra<Rc<Ra and A·Ra=Rb. Therefore, the optimum recording level becomes Rc, the reproduced video signal level becomes Vb3, and the reproduced audio signal level becomes the reference value VR.

In the conventional example, the video signal recording level Rb is found from the video signal recording level Ra without seeing the reproduced video signal level. Thus, although the magnetic tapes I, II, and III differ in magnetic recording and reproducing characteristics, the reproduced audio signal levels become a given value, namely, the reference value VR, but the reproduced video signal levels of the magnetic tapes I, II, and III lessen as Vb1, Vb2, and Vb3; the decrease does not come to a stop and the Vb3 level considerably decreases as compared with Vb1.

In the embodiment of the invention, the maximum level of the reproduced video signal level, VMAX, is compared with the reproduced video signal level and the decrease comes to stop at A·VMAX mentioned above. For the magnetic tape III, the optimum video signal recording level becomes Rb3 and the reproduced video signal level becomes A·VMAX; although the reproduced audio signal level VA1 becomes less than VR, they are balanced as optimum recording.

This means that the optimum recording level can be set more accurately by defining the recording level Rb for the reproduced video signal level.

In the embodiment of the invention, the minimum values and reference values of audio signal levels are defined. The levels are as follows:

Generally, a magnetic tape recorded on a VTR is reproduced with the VTR (self recording and reproducing) or with other VTR (compatible reproducing).

Figure 15:
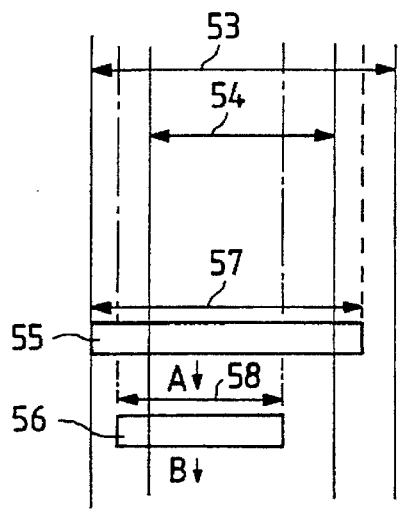
FIG. 15 is a schematic drawing showing tape patterns and head trace at compatible reproducing on a general VTR.

Decrease in the reproduced audio signal level at the compatible reproducing may be caused by misalignment between recorded tape patterns (numeral 53 denotes a video pattern and numeral 54 denotes an audio pattern) and trace heads (numeral 55 denotes a video head and numeral 56 denotes an audio head), the difference between track widths 57 and 58 of the video head 55 and the audio head 56 and the tape patterns, etc., as shown in FIG. 15.

Arrows A and B in the figure denote the move directions of the heads 55 and 56.

Figure 16:
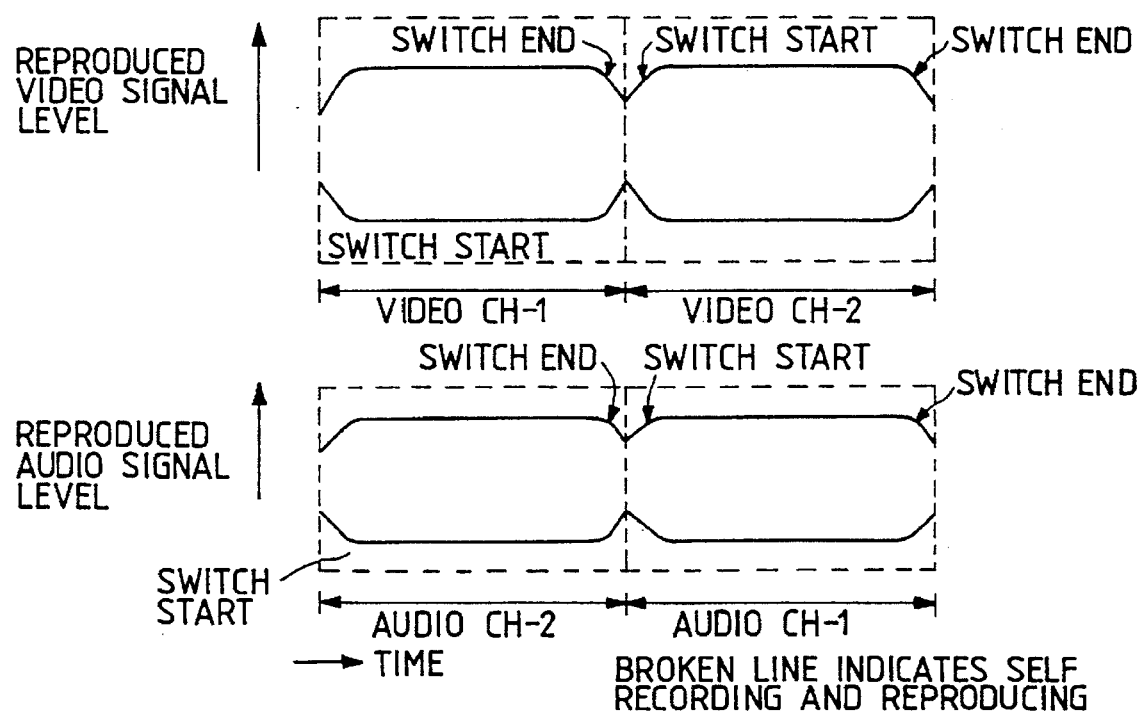
FIG. 16 is an illustration showing signal levels at compatible reproducing on the VTR.
Figure 17A:
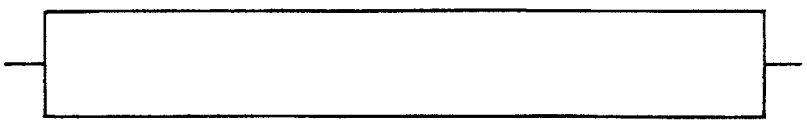
FIGS. 17A–17D are timing charts for explaining the function of the second embodiment.
Figure 17B:
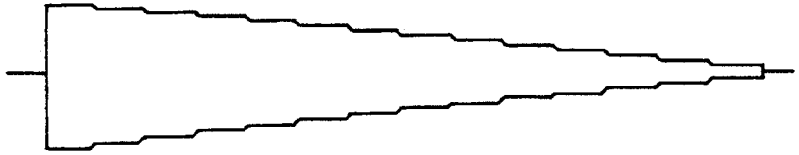
Figure 17C:
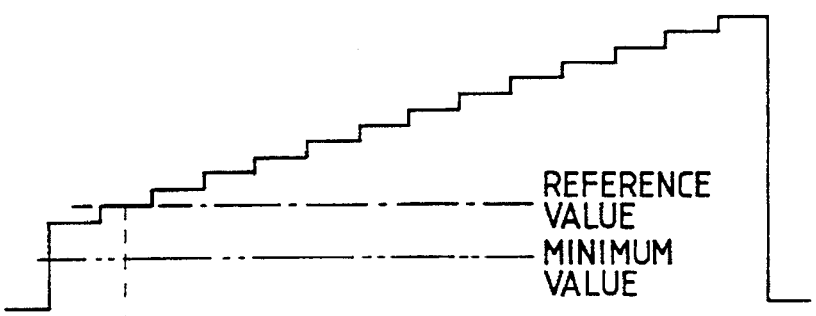
Figure 17D:
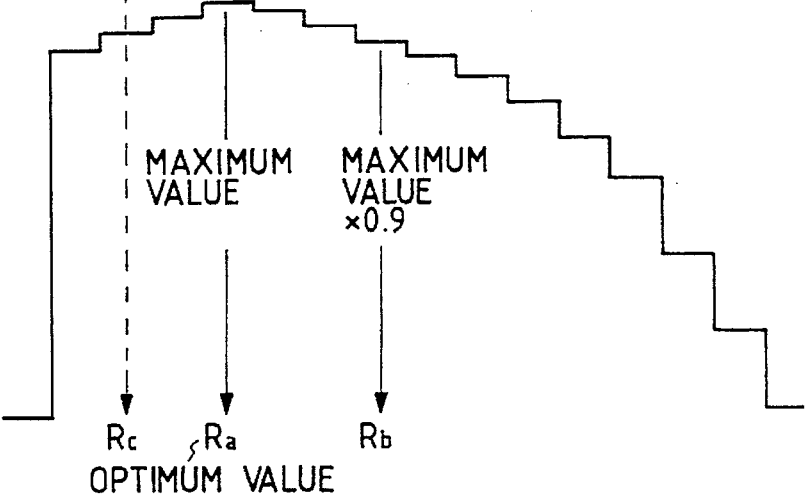

At the compatible reproducing, as shown in FIG. 16, trace difference caused by the mechanical characteristics of the heads near the switch start and switch end of a magnetic tape, namely, near the channel change, increases and the reproduced video signal and reproduced audio signal levels lower as indicated by solid lines.

At the switch start and switch end, no video signal appears on the screen. However, since the audio signal always produces sound, when the level lowers, noise becomes noticeable.

The broken lines indicate the reproduced signal levels at self recording and reproducing.

The reference value, which is the minimum level of the reproduced audio signal level at which noise is suppressed even at the compatible reproducing, becomes considerably larger than the minimum value of the reproduced audio signal level at which noise does not occur at the self recording and reproducing.

Next, the advantage of the embodiment of the invention over the conventional example will be described focusing on the reference values of the reproduced audio signal levels.

Assuming that the reference values of the reproduced audio signal levels in the embodiment of the invention are the same as those in the conventional example, the optimum video signal recording levels are as follows: (However, the embodiment and the conventional example differ in optimum recording level Rb.)

First, in the embodiment, the optimum recording levels become Ra in FIG. 7, Rc in FIG. 8, Rb in FIG. 9, and Rd in FIG. 10.

In the conventional example, the optimum recording levels become Ra in the case corresponding to FIG. 7, Rc in the case corresponding to FIG. 8, Rb in the case corresponding to FIG. 9, and Rb in the case corresponding to FIG. 10.

The embodiment of the invention and the conventional example differ in the optimum recording level as in FIG. 10. In the embodiment, the priority of the minimum value of the reproduced audio signal level is made the highest for suppressing occurrence of audio noise as much as possible; whereas in the conventional example, the video signal has priority and audio noise cannot sufficiently be suppressed.

Assuming that the minimum values of the reproduced audio signal levels in the embodiment are the same as the reference values in the conventional example, the optimum video signal recording levels are as follows:

In the embodiment, the optimum recording levels become Ra in FIG. 7, Rc in FIG. 8, Rb in FIG. 9, and Rd in FIG. 10; in the conventional example, the optimum recording levels become Ra in FIG. 7, Ra in FIG. 8, Rd in FIG. 9, and Rb in FIG. 10.

The embodiment and the conventional example are the same in the case in FIG. 7; in other cases, the conventional example is more advantageous for the video signal than the embodiment, so that C/N of the audio signal degrades.

Although the video signal recording level is changed from small level to large level at the recording current tuning in the embodiment of the invention, it may be changed from large level to small level.

Since the maximum level of the reproduced video signal level can be first detected at reproducing before the maximum level×0.9 can be obtained as shown in FIG. 17 (second embodiment) by changing the recording level from large level to small level, the reproduced video signal level storage 12 for each recording level can be removed. However, the storage 13 for video signal recording level at which the reproduced video signal level reaches the maximum is required.

Since the reproduced video signal level change amount lessens by changing the recording level from large level to small level, it becomes difficult to determine the maximum level of the reproduced video signal level. Thus, the video signal recording level is changed from small level to large level at the recording current tuning and subsequently from large level to small level.

When it is first changed from small level to large level, the maximum level of the reproduced video signal level is stored and the video signal recording level at which the reproduced video signal level reaches the maximum is also stored. Next, when the recording level changes from large level to small level, the maximum level×0.9 of the reproduced video signal level may be obtained.

We have discussed the embodiment of the invention with the reproduced video signal level Vb as A·VMAX, A=0.9 in which remarkable picture quality degradation is not accompanied when compared with the case where the reproduced video signal level becomes the maximum level VMAX, and as A·VMAX, A<1 when the advantages of the embodiment over the conventional example are described. In the description to follow, the reproduced video signal level Vb may be called the minimum value of the reproduced video signal level.

By the way, recent magnetic tapes such as S-VHS tape and HG tape on the market as magnetic video tape provide considerably higher reproduced signal level than normal tape.

Figure 18:
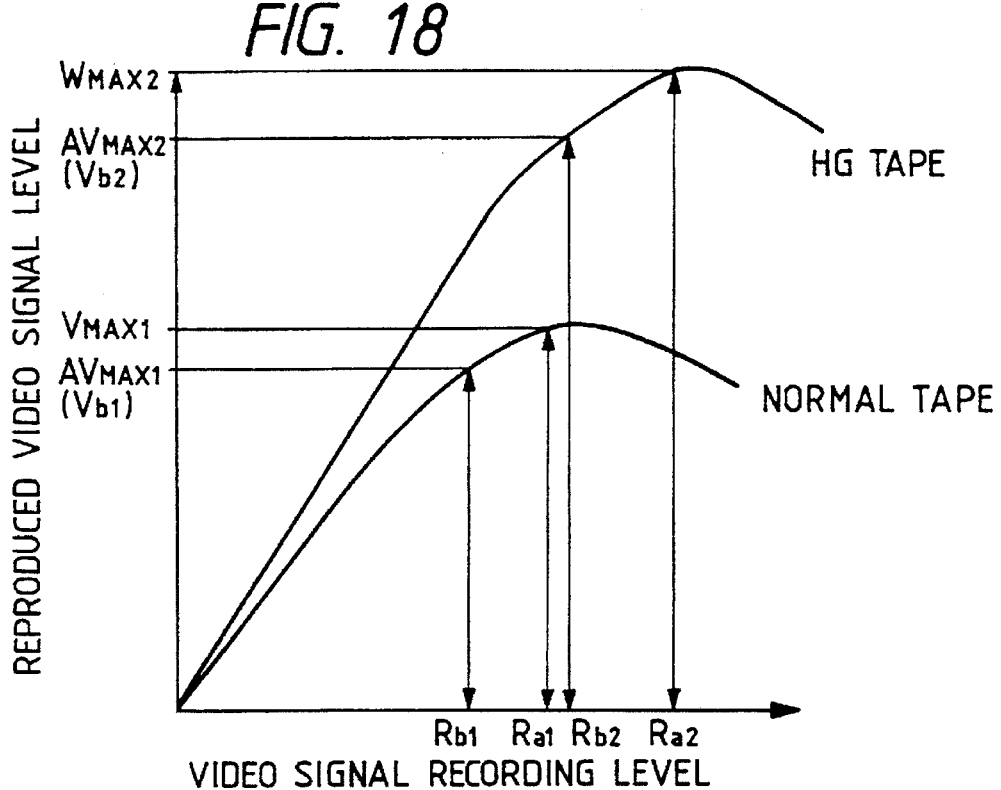
FIGS. 18 is a characteristic chart for explaining the function of the third embodiment of the invention for an HG tape and a normal tape.
Figure 19:
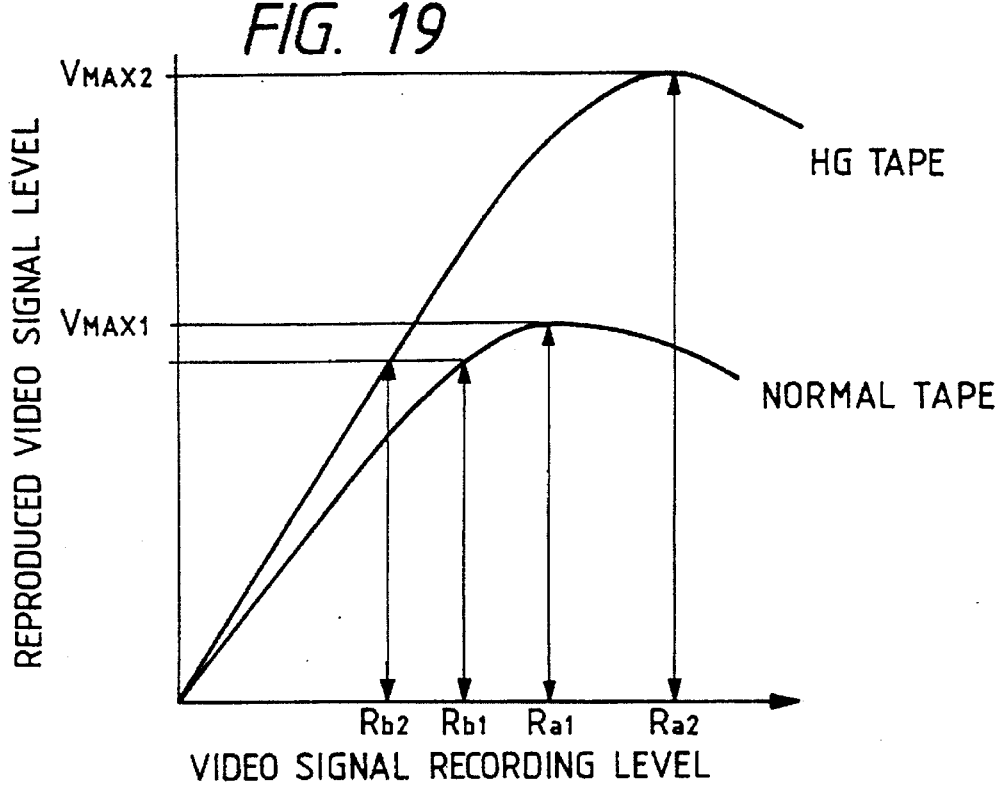
FIG. 19 is a characteristic chart for explaining the function of the fourth embodiment of the invention for an HG tape and a normal tape.

FIGS. 18 and 19 show the relationship between the reproduced video signal level Vb and the video signal recording level Rb according to third and fourth embodiments of the invention with HG tape and normal tape.

In the figures, the maximum reproduced video signal level on normal tape is VMAX1, the video signal recording level at the time is Ra1, the minimum value of the reproduced video signal level, Vb1, is A·VMAX1, and the video signal recording level at the time is Rb1. In the figures, the maximum reproduced video signal level on HG tape is VMAX2, the video signal recording level at the time is Ra2, the minimum value of the reproduced video signal level, Vb2, is A·VMAX2, and the video signal recording level at the time is Rb1.

<Another Embodiment>

In the above described embodiments of invention, the reference value of reproduced audio signal at the first recording level detection means is preset and stored. A fifth embodiment in which it can be automatically set to an optimum value will now be described.

FIG. 20 is a block diagram of the embodiment, wherein only the parts corresponding to the audio signal reproducing system in FIG. 3 are shown and other parts are similar to or identical with those in FIG. 3 and therefore not shown.

The embodiment is an automatic recording current controller of a VTR which also comprises a linear audio signal reproducing audio head and reproduction system audio circuit (not shown) and can reproduce both magnetic tape on which high-fidelity audio signals are recorded as audio signals as well as video signals and magnetic tape on which linear audio signals are recorded. Reproduction output switch control between high-fidelity and linear audio signals is performed by detecting the noise level contained after the high-fidelity audio signal is demodulated and by the detected level amount.

In FIG. 20, minute signals picked up through audio heads 38 and 39 are amplified by a head amplifier 42 on channel 1 and a head amplifier 43 on channel 2.

Since the VTR adopts helical scan, a switch 44 is switched to the signal picking-up channel. The reproduced audio FM signal obtained via the switch 44 is input to a reproduction system audio circuit 46 and a reproduced signal detector 45.

Next, the reproduction system audio circuit 46 will be discussed. Only the reproduced audio FM signal is extracted through a BPF (band-pass filter) 59. The FM signal is demodulated to produce an audio signal by an FM demodulator 60. The unnecessary band component of the audio signal is attenuated through an LPF (low-pass filter) 61. Then, it is restored to audio signal by an audio reproduction processor 62 and output as an audio signal.

Other components than the audio signal band component of the output of the LPF 61 are also extracted through a BPF 63 and the noise component is amplified and converted into DC voltage by a noise detector 64.

The DC voltage is compared with a reference voltage by a comparator 65. A high-fidelity/linear switch control signal whose output voltage goes low if the noise DC voltage is higher than the reference voltage or high if the noise DC voltage is lower than the reference voltage is input to a system controller 3 and used for reproduction output switch control for selecting high-fidelity audio signal from the audio reproduction processor 62 shown in FIG. 20 or linear audio signal from a linear audio reproduction processor (not shown) as reproduced audio signal output by a switch circuit (not shown).

The automatic recording current controller of the embodiment uses the high-fidelity/linear switch control signal to automatically determine the minimum value and the reference value of the reproduced audio signal.

Figure 21A:
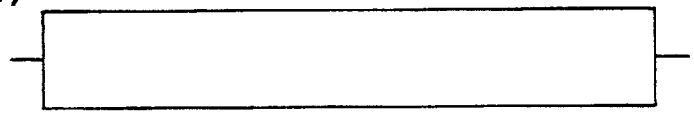
FIGS. 21A–21E are timing charts for explaining the function of the embodiment in FIG. 20.
Figure 21B:
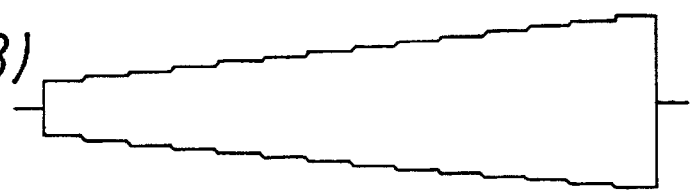
Figure 21C:
Figure 21D:
Figure 21E:
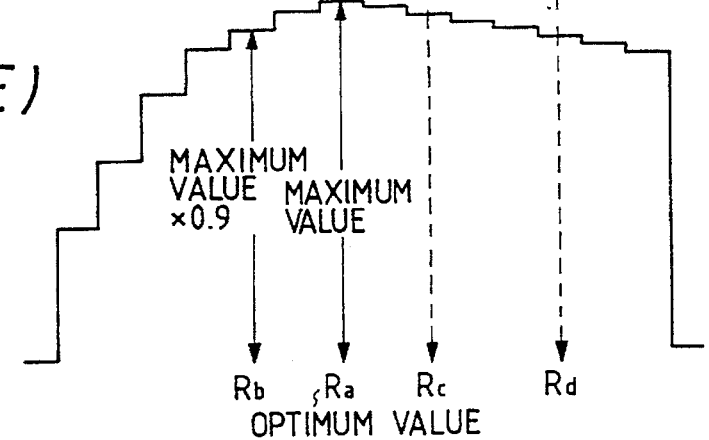

One example will be discussed with reference to FIGS. 21(A) to 21(D). FIG. 21(A) shows high-fidelity audio signal recording current, FIG. 21(B) shows video signal recording current changed step-wise, FIG. 21(C) shows a reproduced audio signal example in which the reproduced signal level lowers step-wise with an increase in the video signal recording current, FIG. 21(D) shows a high-fidelity/linear switch control signal example, and FIG. 21(E) shows a reproduced video signal example.

The reproduced audio signal level just before the high (high-fidelity) to low (linear) state transition of the high-fidelity/linear switch control signal is made the minimum value, the video signal recording level at the time is Rd, double the minimum value of the reproduced audio signal level is the reference value, and the video signal recording level at which the reproduced audio signal level exceeds the reference value is Rc. In this case, the optimum recording level becomes Ra.

When a non-modulated single-wavelength signal is used for the record audio signal (no FM modulation input) at recording current tuning, since it is not necessary to extract the noise component outside the audio signal band through the BPF 63 in FIG. 20, the BPF 63 is not required.

Thus, the reference value and the second value (minimum value) at the first recording level detection means can be automatically set to the optimum values so as not to degrade reproduced audio.

The high-fidelity audio signal in the embodiment is recorded in the deep portion of magnetic tape (video tape) by helical scan like the video signal. The linear audio signal is recorded in the length direction of magnetic tape by a normal VTR.

The effects of the embodiments of the invention discussed above are as follows:

(i) Since a 6-frame signal is recorded for one video signal recording level and the reproduced video signal level is determined from the 6-field average value for each of the video heads 24 and 25, it is hard to receive the effect of a dropout caused by a scratch etc. on a magnetic tape. Incidentally, in the conventional example, eight frames can be recorded for one video signal recording level; in fact, two fields are read per video head. Therefore, it receives the effect of a dropout more easily than the embodiments of the invention.

(ii) Since the reference value and minimum value of audio signal and the maximum level and the maximum level× 0.9 of the reproduced video signal level are considered to set the optimum video signal recording level, even if magnetic tapes differ in recording and reproducing characteristics, their respective optimum characteristics of the magnetic tapes can be derived and characteristic change caused by variation of the video and audio heads with time can be followed.

Assume that

Rd is the video signal recording level at which the reproduced audio signal level is equal to or greater than and nearest to the minimum value, Rb is the video signal recording level at which the reproduced video signal level is equal to or greater than and nearest to the maximum level×0.9, Rc is the video signal recording level at which the reproduced audio signal level is equal to or greater than and nearest to the reference value, and Ra is the video signal recording level at which the reproduced video signal level reaches the maximum, these recording levels are assigned priorities and weighted as Rd>Rb>Rc>Ra as described above, whereby the optimum characteristics of magnetic tapes different in recording and reproducing characteristics can also be derived and the optimum video signal recording level can be set considering compatible reproducing too.

(iii) The optimum recording level can be set for each head, whereby the optimum characteristic can be derived for each head.

(iv) Since the duty ratio of the control signal is changed in synchronization with changing the recording current level at recording current tuning, detection accuracy of recording level change at reproduction is enhanced.

Incidentally, the conventional example requires a frequency oscillator, BPF, rectifier, comparator, etc., for detection of each recording level, increasing costs considerably.

The invention is not limited to the embodiments; for example, it contains the following:

(a) The circuit configurations shown in the embodiments can be changed so as to provide similar functions. For example, a variable-gain record amplifier having no AGC loop can be used in place of the record AGC amplifier 22.

(b) In addition to audio and video signals, for example, a data signal or the like can also be recorded in a deep or surface portion of a recording medium such as magnetic tape or magnetic disk.

(c) Although the maximum reproduced video signal level×0.9 is adopted as the minimum value of the reproduced video signal level, Vb, the coefficient by which the maximum level is multiplied is not limited to 0.9 and a setup value may be subtracted from the maximum value instead of multiplying it by a coefficient.

(d) The specific numeric values shown in the embodiments, such as the number of video signal frames recorded per recording level and the number of recording level steps, may be increased or decreased properly as required.

(e) In the embodiments, the minimum value of the reproduced video signal level, Vb, is a level decreased by a predetermined level from the maximum reproduced video signal level, for example, the maximum level× 0.9. It is intended for degradation suppression for the maximum level depending on magnetic tape, namely, for preventing the minimum value from much lowering from the maximum level. However, the minimum value Vb may be a fixed value from the viewpoint of compensating the minimum picture quality as a VTR.

In this case, as shown in FIG. 19, the video signal recording level at which the reproduced video signal level on a normal tape becomes the minimum value is Rb1 and that on an HG tape is Rb1.

The correspondence between the embodiments and means set forth in the Summary of the Invention section will be described.

In a first aspect of the invention, the first recording head is the audio head, the second recording head is the video head, the first signal is the audio signal, the second signal is the video signal, and the magnetic recording medium is the magnetic tape.

The first recording level is the video signal recording level Rc at which the reproduced audio signal level is equal to or greater than and nearest to the reference value. The second recording level is the video signal recording level Ra at which the reproduced video signal level reaches the maximum. The third recording level is the video signal recording level Rb at which the reproduced video signal level is equal to or greater than and nearest to the maximum level×0.9.

These recording levels Ra, Rb, and Rc are stored in the storages 13, 15, and 14 respectively in FIG. 1. From the stored recording levels Ra, Rb, and Rc, if Ra<Rc, Ra is found as the optimum video signal recording level; if Ra>Rc>Rb, Rc is found; if Ra>Rb>Rc, Rb is found.

In a second aspect of the present invention, the first recording head is the audio head, the second recording head is the video head, the first signal is the audio signal, the second signal is the video signal, and the magnetic recording medium is the magnetic tape, as in the first aspect.

The first recording level is the video signal recording level Rc at which the reproduced audio signal level is equal to or greater than and nearest to the reference value. The second recording level is the video signal recording level Ra at which the reproduced video signal level reaches the maximum. The third recording level is the video signal recording level (Rb) at which the reproduced video signal level becomes a predetermined value.

These recording levels Ra, (Rb), and Rc are stored in the storages in FIG. 1. From the stored recording levels Ra, (Rb), and Rc, if Ra<Rc, Ra is found as the optimum video signal recording level; if Ra>Rc>(Rb), Rc is found; if Ra (Rb)>Rc, (Rb) is found.

In a third aspect of the invention, in addition to the recording levels in the first or second aspect, the video signal recording level Rd at which the reproduced audio signal level is equal to or greater than and nearest to the minimum value, is detected as the fourth recording level. If Rc<Ra <Rb or (Rb), Ra is found as the optimum video signal recording level; if Rd>Ra>Rc>Rb or (Rb), Rc is found; if Ra>Rd>Rb or (Rb)>Rc, Rb or (Rb) is found; if Ra>Rb or (Rb)>Rd >Rc, Rd is found.

In the aspects of the invention, if a plurality of audio heads and video heads are provided, the first to third or fourth recording levels are detected for each of the heads and the optimum video signal recording level is calculated for each video head based on the detected recording levels and stored in the memory, whereby the recording current of each video signal can be controlled separately.

As described above, the automatic recording current controller of a magnetic recorder according to the invention can automatically set the recording level of the second signal to the optimum recording level for controlling the recording current of the second recording head so that the first and second signals are always reproduced at proper levels regardless of the type, recording and reproducing characteristics, etc., of a magnetic recording media to be used.

What is claimed is:

1. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means.

2. The automatic recording current controller of a magnetic recorder as claimed in claim 1 wherein said magnetic recorder is a helical scan magnetic recorder which comrises a first recording head group consisting of two or more first recording heads and a second recording head group consisting of two or more second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means is means for changing a recording level when said second signal is recorded through said second recording head group separately for each of said second recording heads in said second recording head group, said first to third recording level detection means are means for detecting said first to third recording levels of said second signal separately for each of said second recording heads, said optimum recording level arithmetic means is means for assigning priorities to said first to third recording levels detected separately for each of said second recording heads by said recording level detection means for weighting and finding said optimum recording level of said second signal separately for each of said second recording heads by calculation, and said optimum recording level storage means is means for storing said optimum recording level for each of said second recording heads found by said optimum recording level arithmetic means, whereby recording current of each of said second recording heads in said second recording head group is controlled separately based on each optimum recording level stored in said storage means.

3. The automatic recording current controller of a magnetic recorder according to claim 1, further comprising:

control signal recording means for changing a duty ratio of a control signal and for recording said control signal on said magnetic recording medium in synchronization with changing said recording level by said recording level changing means.

4. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means.

5. The automatic recording current controller of a magnetic recorder as claimed in claim 4, wherein said magnetic recorder comprises a helical scan magnetic recorder which comprises a first recording head group including at least two first recording heads and a second recording head group including at least two second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to third recording level detection means comprise means for detecting said first to third recording levels of said second signal separately for each of said second recording heads, said optimum recording level arithmetic means comprises means for assigning priorities to said first to third recording levels detected separately for each of said second recording heads by said recording level detection means for weighting and finding said optimum recording level of said second signal separately for each of said second recording heads by calculation, and said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means.

6. The automatic recording current controller of a magnetic recorder according to claim 4, further comprising:

control signal recording means for changing a duty ratio of a control signal and for recording said control signal on said magnetic recording medium in synchronization with changing said recording level by said recording level changing means.

7. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a first preset value;

first recording level detection means for detecting a first recording level of said second signal when said first signal amount detected by said first signal amount detection means becomes equal to or greater than said first preset value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

fourth recording level detection means for detecting a fourth recording level of said second signal when said first signal amount detected by said first signal amount detection means becomes equal to or greater than a second value less than said first value;

optimum recording level arithmetic means for assigning priorities to said first to fourth recording levels detected by said recording level detection means for weighting and finding an optimum recording level of said second signal by calculation; and optimum recording level storage means for storing said optimum recording level found by said arithmetic means, wherein recording current of said second recording head is controlled based on said optimum recording level stored in said storage means.

8. The automatic recording current controller of a magnetic recorder as claimed in claim 7 wherein said magnetic recorder is a helical scan magnetic recorder which comprises a first recording head group consisting of two or more first recording heads and a second recording head group consisting of two or more second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means is means for changing a recording level when said second signal is recorded through said second recording head group separately for each of said second recording heads in said second recording head group, said first to fourth recording level detection means are means for detecting said first to fourth recording levels of said second signal separately for each of said second recording heads, said optimum recording level arithmetic means is means for assigning priorities to said first to fourth recording levels detected separately for each of said second recording heads by said recording level detection means for weighting and finding said optimum recording level of said second signal separately for each of said second recording heads by calculation, and, said optimum recording level storage means is means for storing said optimum recording level for each of said second recording heads found by said optimum recording level arithmetic means, whereby recording current of each of said second recording heads in said second recording head group is controlled separately based on each optimum recording level stored in said storage means.

9. The automatic recording current controller of a magnetic recorder as claimed in claim 8 wherein said recording level changing means is means for changing a recording level step-wise when said second signal is recorded through said second recording head, further comprising:

control signal recording means for changing a duty ratio of a control signal and recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

10. The automatic recording current controller of a magnetic recorder as claimed in claim 7, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

11. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a first preset value;

first recording level detection means for detecting a first recording level of said second signal when said first signal amount detected by said first signal amount detection means becomes equal to or greater than said first preset value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third level being smaller than said second recording level;

fourth recording level detection means for detecting a fourth recording level of said second signal when said first signal amount detected by said first signal amount detection means becomes equal to or greater than a second value less than said first value;

optimum recording level arithmetic means for assigning priorities to said first to fourth recording levels detected by said recording level detection means for weighting and finding an optimum recording level of said second signal by calculation; and optimum recording level storage means for storing said optimum recording level found by said arithmetic means, wherein recording current of said second recording head is controlled based on said optimum recording level stored in said storage means.

12. The automatic recording current controller of a magnetic recorder as claimed in claim 11, wherein said magnetic recorder comprises a helical scan magnetic recorder which comprises a first recording head group including at least two first recording heads and a second recording head group consisting of two or more second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to fourth recording level detection means comprise means for detecting said first to fourth recording levels of said second signal separately for each of said second recording heads, said optimum recording level arithmetic means comprises means for assigning priorities to said first to fourth recording levels detected separately for each of said second recording heads by said recording level detection means for weighting and finding said optimum recording level of said second signal separately for each of said second recording heads by calculation, and, said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means.

13. The automatic recording current controller of a magnetic recorder as claimed in claim 12, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

14. The automatic recording current controller of a magnetic recorder as claimed in claim 11, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

15. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

16. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

optimum recording level arithmetic means for assigning priorities to said first to third recording levels detected by said first to third recording level detection means, respectively, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said magnetic recorder comprises a helical scan magnetic recorder which comprises a first recording head group including at least two first recording heads and a second recording head group including at least two second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to third recording level detections means comprise means for detecting said first to third recording levels of said second signal separately for each of said second recording heads, said optimum recording level arithmetic means comprises means for assigning priorities to said first to third recording levels detected separately for each of said second recording heads by said recording level detection means for weighting and finding said optimum recording level of said second signal separately for each of said second recording heads by calculation, and said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

17. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium:

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said first signal comprises a high-fidelity audio signal, said controller further comprising:

means for reproducing and demodulating said high-fidelity audio signal recorded in said deep portion of said magnetic recording medium through said first recording head, determining a level of a noise component contained in said demodulated reproduced audio signal, and outputting a high-fidelity/linear switch control signal for switching an audio signal to be output between high-fidelity audio and linear audio; and reference value setting means for automatically setting said reference value based on said level of said reproduced audio signal just before said high-fidelity-to-linear transition of said high-fidelity/linear switch control signal is made by said reproducing and demodulating means.

18. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means decreases by a predetermined level from said maximum level, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said magnetic recorder comprises a helical scan magnetic recorder which comprises a first recording head group including at least two first recording heads and a second recording head group including at least two second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to third recording level detections means comprise means for detecting said first to third recording levels of said second signal separately for each of said second recording heads, said optimum recording level arithmetic means comprises means for assigning priorities to said first to third recording levels detected separately for each of said second recording heads by said recording level detection means for weighting and finding said optimum recording level of said second signal separately for each of said second recording heads by calculation, and said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means, wherein said first signal comprises a high-fidelity audio signal, said controller further comprising:

means for reproducing and demodulating said high-fidelity audio signal recorded in said deep portion of said magnetic recording medium through said first recording head, determining a level of a noise component contained in said demodulated reproduced audio signal, and outputting a high-fidelity/linear switch control signal for switching an audio signal to be output between high-fidelity audio and linear audio; and reference value setting means for automatically setting said reference value based on said level of said reproduced audio signal just before said high-fidelity-to-linear transition of said high-fidelity/linear switch control signal is made by said reproducing and demodulating means.

19. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

20. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said magnetic recorder comprises a helical scan magnetic recorder which comprises a first recording head group including at least two first recording heads and a second recording head group including at least two second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to third recording level detection means comprise means for detecting said first to third recording levels of said second signal separately for each of said second recording heads, said optimum recording level arithmetic means comprises means for assigning priorities to said first to third recording levels detected separately for each of said second recording heads by said recording level detection means for weighting and finding said optimum recording level of said second signal separately for each of said second recording heads by calculation, and said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means, wherein said recording level changing means comprises means for changing a recording level step-wise when said second signal is recorded through said second recording head, said controller further comprising:

control signal recording means for changing a duty ratio of a control signal and for recording said control signal on said magnetic recording medium in synchronization with changing said recording level by said recording level changing means; and means for reproducing said recorded control signal from said magnetic recording medium, detecting said duty ratio of said control signal, and using said duty ratio as an address of said recording level changed step-wise and recorded.

21. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said first signal comprises a high-fidelity audio signal, said controller further comprising:

means for reproducing and demodulating said high-fidelity audio signal recorded in said deep portion of said magnetic recording medium through said first recording head, determining a level of a noise component contained in said demodulated reproduced audio signal, and outputting a high-fidelity/linear switch control signal for switching an audio signal to be output between high-fidelity audio and linear audio; and reference value setting means for automatically setting said reference value based on said level of said reproduced audio signal just before said high-fidelity-to-linear transition of said high-fidelity/linear switch control signal is made by said reproducing and demodulating means.

22. An automatic recording current controller of a magnetic recorder which comprises first and second recording heads and is capable of double magnetic recording in which a first signal is recorded in a deep portion of a magnetic recording medium through said first recording head and then a second signal is recorded in a surface portion of said magnetic recording medium through said second magnetic head, said automatic recording current controller comprising:

recording level changing means for changing a recording level when said second signal is recorded through said second recording head;

first signal amount detection means for detecting an amount of said first signal recorded in said deep portion of said magnetic recording medium;

second signal amount detection means for detecting an amount of said second signal recorded in said surface portion of said magnetic recording medium;

means for storing a preset reference value;

first recording level detection means for detecting a first recording level of said second signal when said first signal amount detected by said first signal amount detection means becomes equal to or greater than said preset reference value;

second recording level detection means for detecting a second recording level of said second signal when said second signal amount detected by said second signal amount detection means reaches a maximum level;

third recording level detection means for detecting a third recording level of said second signal when said second signal amount detected by said second signal amount detection means becomes a predetermined amount, said third recording level being smaller than said second recording level;

optimum recording level arithmetic means for assigning priorities to said first to third recording levels detected by said first to third recording level detection means, for weighting and finding an optimum recording level of said second signal by calculation; and optimum recording level storage means for storing said optimum recording level found by said arithmetic means, wherein a recording current of said second recording head is controlled based on said optimum recording level stored in said storage means, wherein said magnetic recorder comprises a helical scan magnetic recorder which comprises a first recording head group including at least two first recording heads and a second recording head group including at least two second recording heads and is capable of double magnetic recording in which a first signal is recorded in a deep portion of a magnetic recording medium through said first recording head group and then a second signal is recorded in a surface portion of said magnetic recording medium through said second magnetic head group, and wherein said recording level changing means comprises means for changing a recording level when said second signal is recorded through said second recording head group separately for each of said second recording heads in said second recording head group, said first to third recording level detection means comprise means for detecting said first to third recording levels of said second signal separately for each of said second recording heads, said optimum recording level arithmetic means comprises means for assigning priorities to said first to third recording levels detected separately for each of said second recording heads by said recording level detection means for weighting and finding said optimum recording level of said second signal separately for each of said second recording heads by calculation, and said optimum recording level storage means comprises means for storing said optimum recording level for each of said second recording heads found by said optimum recording level arithmetic means, whereby a recording current of each of said second recording heads in said second recording head group is controlled separately based on each optimum recording level stored in said storage means, wherein said first signal comprises a high-fidelity audio signal, said controller further comprising:

means for reproducing and demodulating said high-fidelity audio signal recorded in said deep portion of said magnetic recording medium through said first recording head, determining a level of a noise component contained in said demodulated reproduced audio signal, and outputting a high-fidelity/linear switch control signal for switching an audio signal to be output between high-fidelity audio and linear audio; and reference value setting means for automatically setting said reference value based on said level of said reproduced audio signal just before said high-fidelity-to-linear transition of said high-fidelity/linear switch control signal is made by said reproducing and demodulating means.

* * * * *